(12) United States Patent
Yokoe et al.

(10) Patent No.: US 10,677,333 B2
(45) Date of Patent: Jun. 9, 2020

(54) ROTATION TRANSMISSION MECHANISM AND DAMPER DEVICE

(71) Applicant: NIDEC SANKYO CORPORATION, Suwa-gun Nagano (JP)

(72) Inventors: Satoru Yokoe, Suwa-gun Nagano (JP); Takehiko Yazawa, Suwa-gun Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 161 days.

(21) Appl. No.: 15/847,106

(22) Filed: Dec. 19, 2017

(65) Prior Publication Data

US 2018/0172125 A1   Jun. 21, 2018

(30) Foreign Application Priority Data

Dec. 20, 2016  (JP) .................................. 2016-246816
May 26, 2017  (JP) .................................. 2017-104123

(51) Int. Cl.
*F16H 25/18* (2006.01)
*F16H 25/16* (2006.01)
*F16H 37/12* (2006.01)
*F25D 17/04* (2006.01)

(52) U.S. Cl.
CPC ........... *F16H 37/122* (2013.01); *F16H 25/16* (2013.01); *F16H 25/18* (2013.01); *F25D 17/045* (2013.01)

(58) Field of Classification Search
CPC ........ F16H 37/122; F16H 25/16; F16H 25/18; F25D 17/045; F25D 17/08; Y10T 74/1441; Y10T 74/1429; Y10T 74/1424; Y10T 74/19879; Y10T 74/19874; Y10T 74/1994

See application file for complete search history.

(56) References Cited

U.S. PATENT DOCUMENTS

| 6,244,564 | B1 * | 6/2001 | Noritake | ............... | F16K 31/043 |
|           |      |        |          |                | 251/129.11  |
| 7,155,992 | B2 * | 1/2007 | Noritake | ................ | F16H 19/00 |
|           |      |        |          |                | 74/411.5    |
| 2008/0257086 | A1 * | 10/2008 | Noritake | .................. | H02K 7/06 |
|           |      |        |          |                | 74/422      |
| 2016/0348806 | A1 * | 12/2016 | Noritake | ............... | F16K 31/535 |

FOREIGN PATENT DOCUMENTS

JP            H10306970 A     11/1998

* cited by examiner

*Primary Examiner* — Daniel D Yabut
(74) *Attorney, Agent, or Firm* — Cantor Colburn LLP

(57) ABSTRACT

A rotation transmission mechanism may include a drive wheel structured to rotate to one side, a driven wheel turned by the drive wheel to one side, and an urging member urging the driven wheel to turn to the other side. The drive wheel may include a drive teeth forming part where drive teeth structured to turn the driven wheel to the one side are provided at positions different from each other in an axial line direction, and a cam face forming part on which the driven wheel is slid. The driven wheel is provided with a driven teeth forming part where driven teeth provided at positions different from each other in an axial line direction are disposed over an angular range so that, when the drive wheel is turned to the one side, the drive teeth are sequentially abutted with the driven teeth.

39 Claims, 19 Drawing Sheets

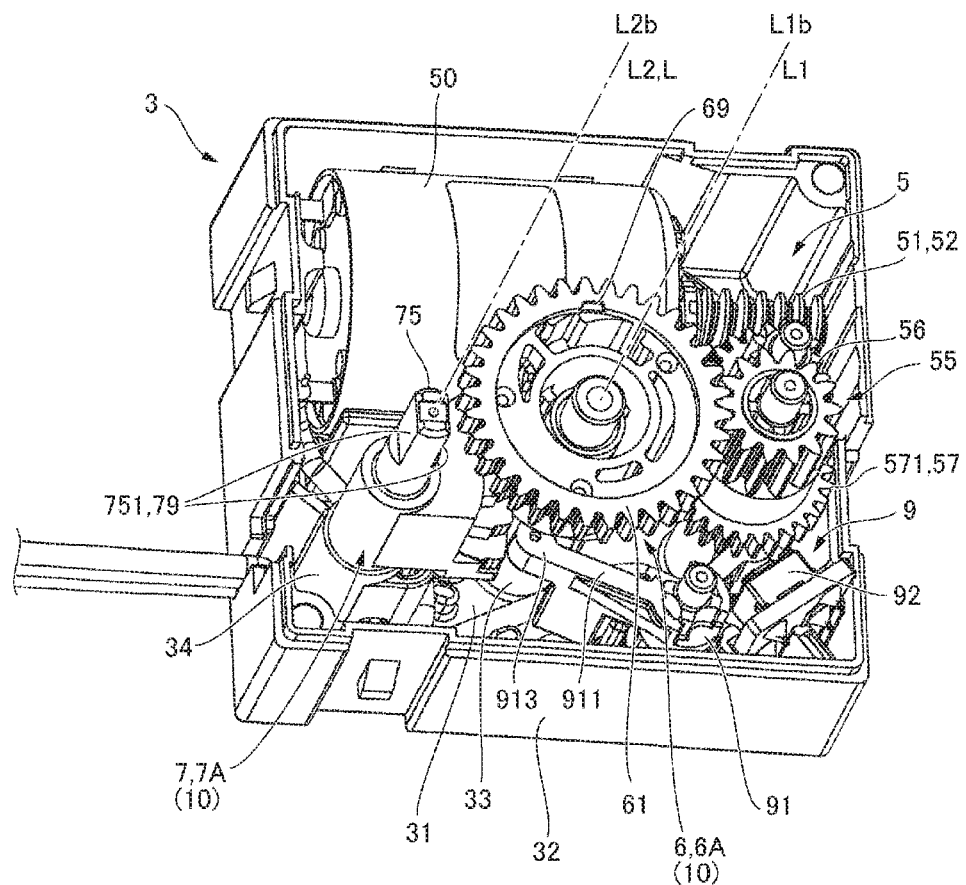
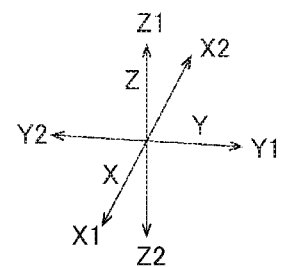
FIG. 19

ROTATION TRANSMISSION MECHANISM AND DAMPER DEVICE

CROSS REFERENCE TO RELATED APPLICATION

The present invention claims priority under 35 U.S.C. § 119 to Japanese Application No. 2016-246816 filed Dec. 20, 2016, and Japanese Application No. 2017-104123 filed May 26, 2017, the entire contents of which are incorporated herein by reference.

FIELD OF THE INVENTION

At least an embodiment of the present invention may relate to a rotation transmission mechanism structured to transmit rotation of a drive wheel to a driven wheel and a damper device.

BACKGROUND

A damper device which is used in a cold air passage of a refrigerator is, for example, structured so that a baffle is driven by a baffle drive mechanism including a motor and a gear train to open and close an opening part formed in a frame (see, for example, Japanese Patent Laid-Open No. Hei 10-306970). In the damper device, the baffle is driven in an open direction by the motor. However, the baffle is driven in a close direction by rotating the motor in a reverse direction.

In the damper device described in the above-mentioned Patent Literature or the like, when the motor is rotated in both directions, a control circuit and a drive circuit become complicated and thus cost is increased.

SUMMARY

In view of the problem described above, at least an embodiment of the present invention may advantageously provide a rotation transmission mechanism and a damper device in which a driven wheel is capable of being turned in both directions by a drive wheel which is rotated in one direction.

According to at least an embodiment of the present invention, there may be provided a rotation transmission mechanism including a drive wheel structured to rotate to one side around a first axial line, a driven wheel which is driven and turned by the drive wheel to one side around a second axial line parallel to the first axial line, and an urging member which urges the driven wheel to the other side around the second axial line. The drive wheel includes a drive teeth forming part in which a plurality of drive teeth structured to drive and turn the driven wheel to the one side around the second axial line is disposed in a circumferential direction and a cam face forming part on which the driven wheel is slid when the driven wheel is turned to the other side around the second axial line by an urging force of the urging member, and the drive teeth forming part and the cam face forming part are provided so as to be adjacent to each other in the circumferential direction. The driven wheel includes a driven teeth forming part in which a plurality of driven teeth is disposed over an angular range so that, when the drive wheel is turned to the one side around the first axial line, the drive teeth are sequentially abutted with the driven teeth. In addition, the plurality of the drive teeth is provided at positions different from each other in the first axial line direction, and the plurality of the driven teeth is provided at positions different from each other in the second axial line direction.

In at least an embodiment of the present invention, when the drive wheel is rotated (turned) to one side around the first axial line, the drive teeth drive the driven wheel to one side around the second axial line through the driven teeth and, after that, engagement of the drive teeth with the driven teeth is released, the driven wheel is turned to the other side around the second axial line by an urging force of the urging member. In this case, the driven wheel slides on the cam face forming part which is provided in the drive wheel. Therefore, even when the drive wheel is rotated (turned) only to one side around the first axial line, the driven wheel is driven and turned to one side around the second axial line and, in addition, the driven wheel is turned to the other side around the second axial line. Accordingly, a structure of a control circuit for the motor and the like can be simplified. Further, when the driven wheel is turned to the other side around the second axial line, an urging force of the urging member is utilized. However, in this case, the driven wheel slides on the cam face forming part of the drive wheel and thus, speed and the like of the driven wheel when turned to the other side around the second axial line can be controlled. In addition, a plurality of the drive teeth and a plurality of the driven teeth are respectively provided at positions different from each other in an axial line direction and thus the drive teeth and the driven teeth can be meshed with each other in a predetermined combination. Therefore, an angular position of the driven wheel can be controlled appropriately.

In at least an embodiment of the present invention, the cam face forming part is provided with a plurality of cam faces at positions different from each other in the first axial line direction on which the plurality of the driven teeth are sequentially slid when the driven wheel is turned to the other side around the second axial line by the urging force of the urging member. According to this structure, when the driven wheel is to be turned to the other side around the second axial line by the urging force of the urging member, the plurality of the driven teeth sequentially slides on the plurality of the cam faces. Therefore, when the driven wheel is to be turned to the other side around the second axial line by the urging force of the urging member, turning speed and the like of the driven wheel can be controlled over a wide angular range.

In at least an embodiment of the present invention, an outer diameter of each of the plurality of the cam faces is reduced from the one side around the first axial line to the other side. According to this structure, the plurality of the driven teeth is capable of smoothly and sequentially sliding on the plurality of cam faces.

In at least an embodiment of the present invention, the drive teeth forming part is provided with the drive teeth one by one at the positions in the first axial line direction, and the driven teeth forming part is provided with the driven teeth one by one at the positions in the second axial line direction. According to this structure, the drive teeth and the driven teeth can be meshed with each other in a predetermined combination and thus an angular position of the driven wheel can be controlled appropriately.

In at least an embodiment of the present invention, in each of regions where the plurality of the driven teeth are sequentially slid on the plurality of the cam faces, a subsequent driven tooth for a next region begins to contact with a subsequent corresponding cam face while the driven tooth in a current region is contacted with its corresponding cam face. According to this structure, the plurality of the driven teeth is capable of sequentially and smoothly sliding on the plurality of the cam faces and thus, when a combination of the driven tooth and the cam face sliding each other is transferred, the driven wheel is restrained from being rapidly turned.

In at least an embodiment of the present invention, in the plurality of the drive teeth, the drive tooth located on the one side in the first axial line direction is located on the other side around the first axial line with respect to the drive tooth located on the other side in the first axial line direction and, in the plurality of the driven teeth, the driven tooth located on the one side in the second axial line direction is located on the other side around the second axial line with respect to the driven tooth located on the other side in the second axial line direction and, in the plurality of the cam faces, the cam face located on the one side in the first axial line direction is located on the one side around the first axial line with respect to the cam face located on the other side in the first axial line direction. According to this structure, the plurality of the drive teeth, the plurality of the driven teeth, and the plurality of the cam faces can be formed in stepped shapes and thus the drive wheel and the driven wheel are easily manufactured. Further, even when a positional relationship between the drive wheel and the driven wheel is displaced in the axial line direction, each of the drive teeth is restrained from being abutted with an unexpected driven tooth.

In at least an embodiment of the present invention, each of the plurality of the drive teeth is formed so that a face on the one side around the first axial line is formed to be a tooth face, the drive wheel is provided with a first step part which is formed at a position adjacent in the circumferential direction to the tooth face of a final drive tooth located on the most other side around the first axial line, and the first step part is provided with an outer peripheral face which intersects an end part on an outer side in a radial direction of the tooth face of the final drive tooth. Alternatively, in at least an embodiment of the present invention, each of the plurality of the drive teeth is formed so that a face on the one side around the first axial line is formed to be a tooth face, the drive wheel is provided with a first recessed part which is formed at a position adjacent in the circumferential direction to the tooth face of a final drive tooth located on the most other side around the first axial line, and the first recessed part is provided with an inner peripheral face which intersects an end part on an outer side in the radial direction of the tooth face of the final drive tooth. In other words, it may be structured that the drive wheel is provided with a drive tooth pitch measuring step part which intersects the end part on the outer side in the radial direction of the tooth face of the final drive tooth located on the most other side around the first axial line. According to this structure, an intersecting point of the tooth face of the final drive tooth and the outer peripheral face of the first step part can be measured, or an intersecting point of the tooth face of the final drive tooth and the inner peripheral face of the first recessed part can be measured. Therefore, a position of a tooth tip of the drive tooth can be accurately measured and thus the pitches of the drive teeth can be measured accurately.

In at least an embodiment of the present invention, each of the plurality of the driven teeth is formed so that a face on the other side around the second axial line is formed to be a tooth face, the driven wheel is provided with a second step part which is formed at a position adjacent in the circumferential direction to the tooth face of a first driven tooth located on the most one side around the second axial line, and the second step part is provided with an outer peripheral face which intersects an end part on an outer side in a radial direction of the tooth face of the first driven tooth. Alternatively, in at least an embodiment of the present invention, it may be structured that each of the plurality of the driven teeth is formed so that a face on the other side around the second axial line is formed to be a tooth face, the driven wheel is provided with a second recessed part which is formed at a position adjacent in the circumferential direction to the tooth face of a first driven tooth located on the most one side around the second axial line, and the second recessed part is provided with an inner peripheral face which intersects the end part on the outer side in the radial direction of the tooth face of the first driven tooth. In other words, it may be structured that the driven wheel is provided with a driven tooth pitch measuring step part which intersects the end part on the outer side in the radial direction of the tooth face of the first driven tooth located on the most one side around the second axial line. According to this structure, an intersecting point of the tooth face of the first driven tooth and the outer peripheral face of the second step part can be measured, or an intersecting point of the tooth face of the first driven tooth and the inner peripheral face of the second recessed part can be measured. Therefore, the pitches of the driven teeth can be measured accurately.

In at least an embodiment of the present invention, the driven wheel is provided with an extended part which is formed by extending the driven teeth forming part to the one side in the second axial line direction with respect to the first driven tooth, and the second step part is formed in the extended part. According to this structure, the driven teeth forming part can be secured with a height where the second step part can be formed.

In at least an embodiment of the present invention, the driven teeth forming part is provided with a final driven tooth with which the drive teeth are not abutted on the one side around the second axial line with respect to the plurality of the driven teeth and on the other side in the second axial line direction with respect to the plurality of the driven teeth, and the cam face forming part is provided with a final cam face with which the final driven tooth is abutted.

In at least an embodiment of the present invention, respective pitches of the plurality of the driven teeth are equal to each other, and a pitch between the driven tooth located on the most one side around the second axial line and the final driven tooth is wider than the pitches of the plurality of the driven teeth. According to this structure, the state that the driven teeth slide on the cam face can be smoothly transferred to the state that the final driven tooth slides on the final cam face and thus the driven wheel is restrained from being rapidly turned.

In at least an embodiment of the present invention, outer diameters of each of the cam faces and the final cam face are reduced from the one side around the first axial line to the other side, a reducing rate in the circumferential direction of the outer diameter of a portion of the final cam face located on the one side around the first axial line is smaller than reducing rates of the plurality of the cam faces, and a reducing rate in the circumferential direction of the outer diameter of a portion of the final cam face located on the other side around the first axial line is larger than reducing rates of the plurality of the cam faces.

In at least an embodiment of the present invention, in each of the plurality of the cam faces, an end part on the one side around the first axial line is located on an outer side in the radial direction with respect to the cam face adjacent on the one side around the first axial line.

In at least an embodiment of the present invention, the plurality of the cam faces comprises a cam face whose end part on the one side around the first axial line is overlapped with an outer side edge of the cam face which is adjacent to the one side around the first axial line.

In at least an embodiment of the present invention, each of the plurality of the cam faces comprises a cam region which is not overlapped in the circumferential direction with the cam face adjacent on the other side around the first axial line, and the cam region of the first cam face located on the most one side around the first axial line is wider in the circumferential direction than the cam regions of the other cam faces except the final cam face located on the most other side around the first axial line. According to this structure, when the plurality of the driven teeth is sequentially slid on the plurality of the cam faces, a region where the first driven tooth sliding on the first cam region is long and thus, when the driven wheel is to be turned, the driven wheel can be turned slowly in the beginning.

In at least an embodiment of the present invention, a turning speed of the driven wheel during one of the plurality of the driven teeth is slid on the first cam face is smaller than a turning speed of the driven wheel during another one of the plurality of the driven teeth is slid on its corresponding cam face which is different from the first cam face and the final cam face. According to this structure, a turning speed is fast when the driven tooth slides on the first cam face and thus, when the driven wheel is to be turned, the driven wheel can be turned slowly in the beginning.

In at least an embodiment of the present invention, the plurality of the cam faces comprises a second cam face located at a second position from the most one side around the first axial line, and an end part on the one side around the first axial line of the second cam face is located on an inner side in the radial direction with respect to an end part on the one side around the first axial line of the cam face located on the other side around the first axial line with respect to the second cam face. According to this structure, a timing when the second driven tooth begins to contact with the second cam face is delayed and thus a region that the first driven tooth slides in the first cam face becomes longer. Therefore, when the driven wheel is to be turned, the driven wheel can be turned slowly in the beginning and a region where the driven wheel is turned slowly can be made longer.

In at least an embodiment of the present invention, the rotation transmission mechanism further includes a position sensor structured to monitor an angular position of the drive wheel or the driven wheel.

In at least an embodiment of the present invention, the position sensor includes a turnable lever which is displaced by a sensor cam face provided in the drive wheel, and a switch which is turned on and off by displacement of the turnable lever.

In at least an embodiment of the present invention, the position sensor is structured so that, after the driven wheel is turned to the most one side around the second axial line, an output of the switch is switched at a midway position in a stopped region of the driven wheel and, after the driven wheel is turned to the most other side around the second axial line, the output of the switch is switched at a midway position in a stopped region of the driven wheel. According to this structure, even when a positional relationship between the drive wheel and the turnable lever is displaced to some extent, the stopped state of the driven wheel can be surely monitored through the output of the switch.

In at least an embodiment of the present invention, the drive wheel comprises a first assembling mark structured to position a turning position of the drive wheel around the first axial line to an assembling reference position. According to this structure, the turning position of the drive wheel can be easily positioned to the assembling reference position and thus workability in assembling is improved.

In at least an embodiment of the present invention, the driven wheel comprises a second assembling mark structured to position a turning position of the driven wheel around the second axial line to an assembling reference position. According to this structure, the turning position of the driven wheel can be easily positioned to the assembling reference position and thus workability in assembling is improved.

The rotation transmission mechanism in accordance with at least an embodiment of the present invention may be used in a damper device. In this case, the damper device includes a frame which is formed with an opening part, a motor structured to drive the drive wheel, and a baffle to which turning of the driven wheel around the second axial line is transmitted and thereby the opening part is opened and closed by the baffle.

In the damper device in accordance with at least an embodiment of the present invention, the urging member urges the baffle in an open direction or a close direction with respect to the opening part and thereby the urging member urges the driven wheel to the other side around the second axial line.

In at least an embodiment of the present invention, the motor is capable of outputting a rotation driving force for driving the drive wheel only to the one side around the first axial line. According to this structure, an inexpensive motor which is rotated only one direction can be used.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 19 is a perspective view showing a baffle drive mechanism including the drive wheel and the driven wheel and a cover in the second modified embodiment.

DETAILED DESCRIPTION

A rotation transmission mechanism and a damper device for a refrigerator to which the present invention is applied will be described below with reference to the accompanying drawings. In the following descriptions, a turning center axial line of a baffle 4 is indicated by "L", a rotation center axial line of a drive wheel 6 is referred to as a first axial line "L1", and a turning center axial line of a driven wheel 7 is referred to as a second axial line "L2". Further, a direction along the turning center axial line "L" is referred to as an "X" direction, a direction intersecting the turning center axial line "L" (direction in which cold air flows) is referred to as a "Z" direction, and a direction intersecting the "X" direction and the "Z" direction is referred to as a "Y" direction. Further, one side in the "X" direction is indicated by "X1", the other side in the "X" direction is indicated by "X2", one side in the "Y" direction is indicated by "Y1", the other side in the "Y" direction is indicated by "Y2", one side in the "Z" direction is indicated by "Z1", and the other side in the "Z" direction is indicated by "Z2".

(Entire Structure)

Figure 1:
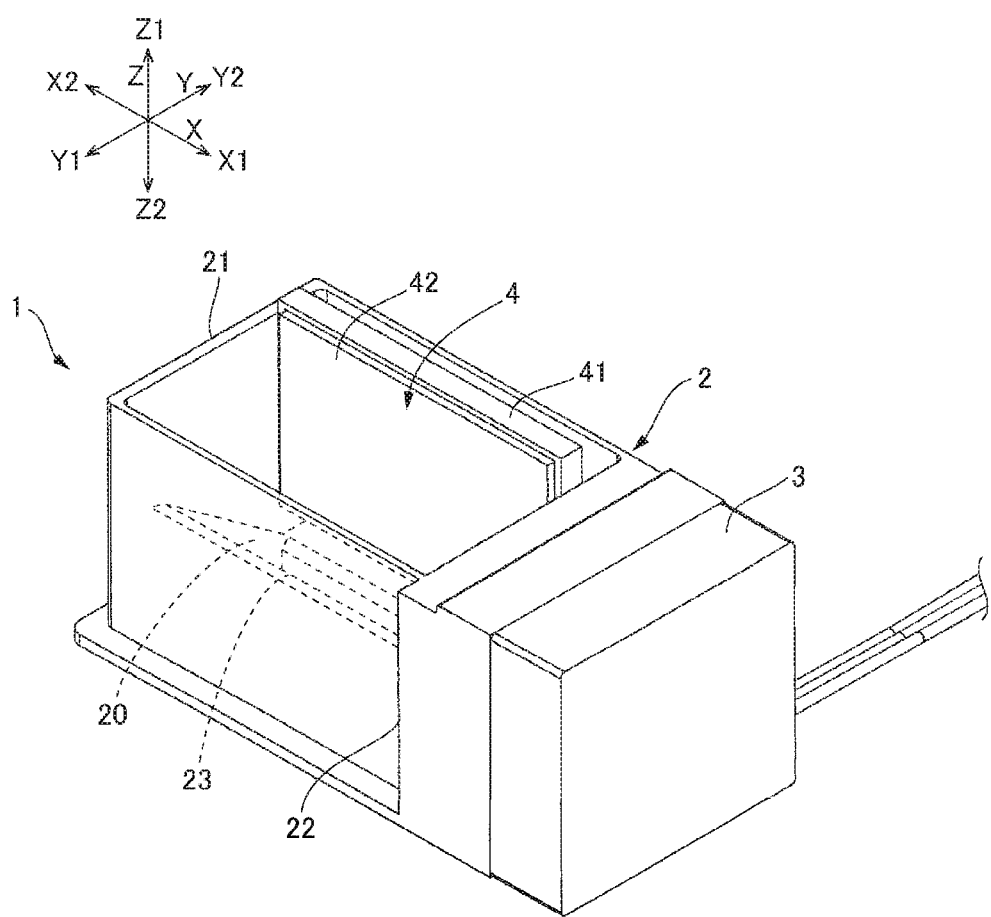
FIG. 1 is a perspective view showing a damper device in accordance with an embodiment of the present invention.
Figure 2:
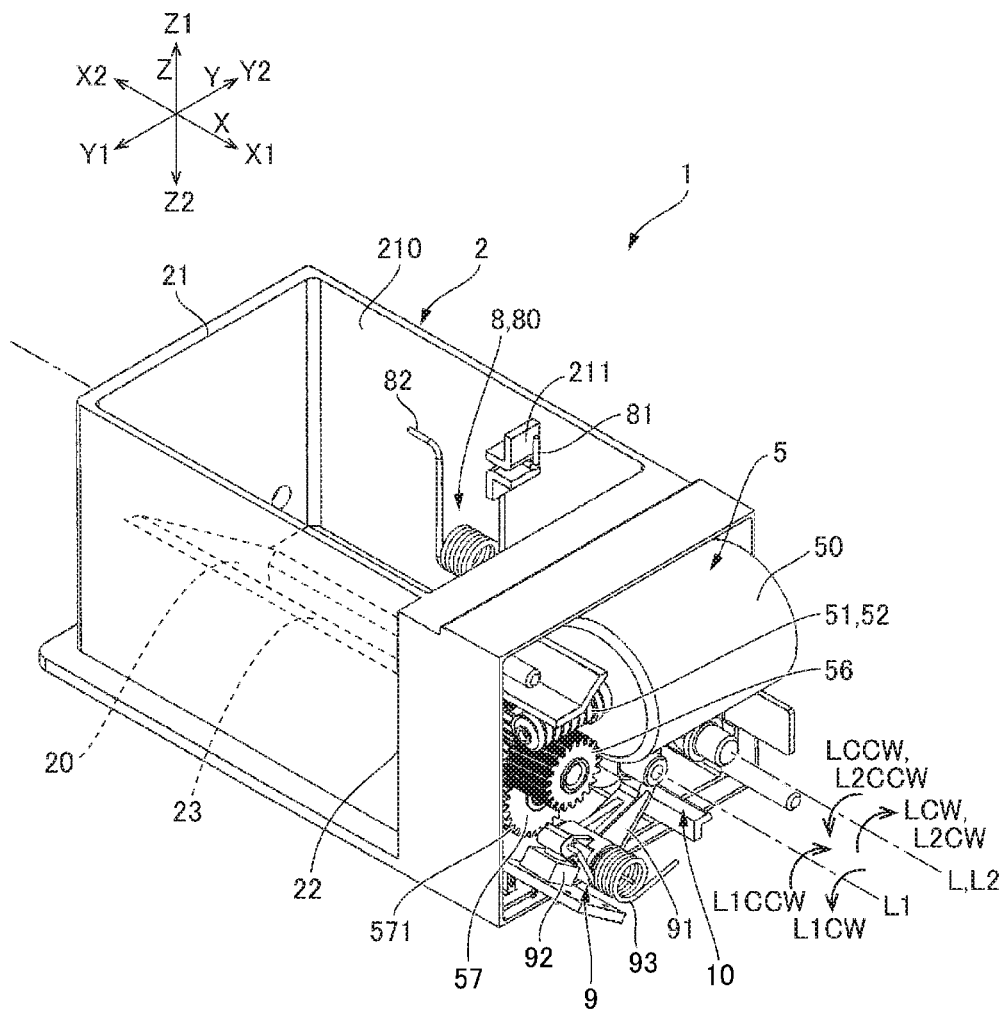
FIG. 2 is a perspective view showing a state that a cover is detached from the damper device shown in FIG. 1.

FIG. 1 is a perspective view showing a damper device 1 to which the present invention is applied. FIG. 2 is a perspective view showing a state that a cover 3 is detached from the damper device 1 shown in FIG. 1. FIG. 1 shows a state that a baffle 4 is turned to one side "LCW" around the turning center axial line "L" and is stood up in an open posture in which an opening part 20 is opened.

A damper device 1 shown in FIGS. 1 and 2 is a device structured to control supply of cold air in a cold air passage or the like of a refrigerator. The damper device 1 includes a frame 2 in which rectangular opening part 20 is formed, a baffle 4 for opening and closing the opening part 20 of the frame 2, and a baffle drive mechanism 5 structured to drive the baffle 4. The frame 2 is provided with a tube part 21 through which cold air flows in the "Z" direction, and a partition 22 which partitions a space in which the baffle drive mechanism 5 is disposed. The tube part 21 is opened toward both sides in the "Z" direction. The baffle drive mechanism 5 is covered by a cover 3 which is connected with the frame 2 by a hook mechanism. The frame 2 and the cover 3 are made of resin.

A frame-shaped seal part 23 which is obliquely inclined is formed on an inner side of the tube part 21, and an inner side of the seal part 23 is formed to be an opening part 20. The baffle 4 is turnably supported by the frame 2 around the turning center axial line "L" extended in the "X" direction on an inner side of the tube part 21. In a state shown in FIG. 1, the baffle 4 is set in an open posture in which the baffle 4 is separated from the seal part 23 and the opening part 20 is opened. When the baffle drive mechanism 5 turns the baffle 4 to the other side "LCCW" around the turning center axial line "L" from this state and the baffle 4 is abutted with the seal part 23, the baffle 4 is set in a closing posture in which the opening part 20 is closed. In this embodiment, the baffle 4 includes an opening and closing plate 41 whose size is larger than the opening part 20 and a sheet-shaped elastic member 42 made of foamed polyurethane or the like which is stuck on a face on the opening part 20 side of the opening and closing plate 41. The elastic member 42 is abutted with a periphery (seal part 23) of the opening part 20 to close the opening part 20. Cold air is flowed from an opposite side (the other side "Z2" in the "Z" direction) to the side where the baffle 4 is disposed (one side "Z1" in the "Z" direction) with respect to the opening part 20 to the one side "Z1" in the "Z" direction through the opening part 20. Alternatively, cold air may be flowed from the side where the baffle 4 is disposed (one side "Z1" in the "Z" direction) with respect to the opening part 20 to the other side "Z2" in the "Z" direction through the opening part 20.

(Baffle Drive Mechanism)

Figure 3:
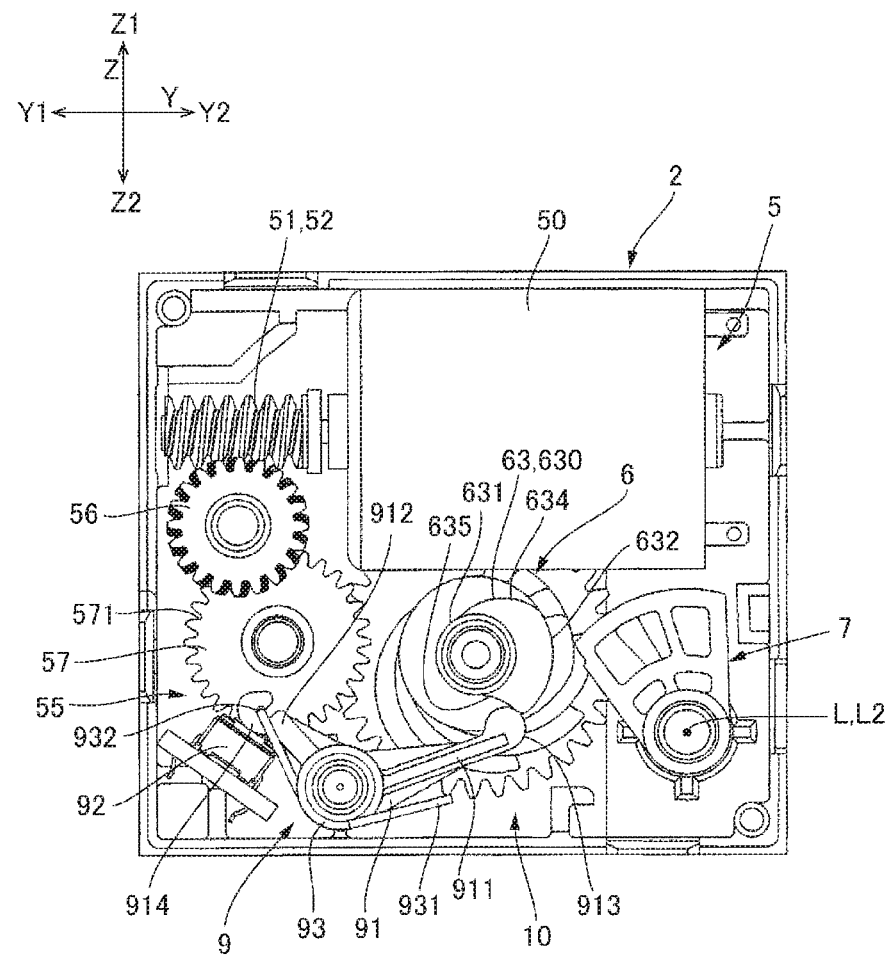
FIG. 3 is an explanatory view showing a drive part of the damper device shown in FIG. 1 which is viewed from one side in a rotation center axial line direction.

FIG. 3 is an explanatory view showing a drive part of the damper device 1 shown in FIG. 1 which is viewed from one side in the turning center axial line "L" direction. As shown in FIGS. 2 and 3, the baffle drive mechanism 5 includes a motor 50 and a transmission mechanism 55 structured to transmit rotation of the motor 50 to the baffle 4. The transmission mechanism 55 includes a worm gear 52 formed on an output shaft 51 of the motor 50, a worm wheel 56 meshed with the worm gear 52, a composite gear 57 provided with a large diameter gear 571 which is meshed with a gear (not shown) formed in the worm wheel 56, and a rotation transmission mechanism 10 to which rotation of the composite gear 57 is transmitted through a small diameter gear (not shown) of the composite gear 57. Rotation of the rotation transmission mechanism 10 is transmitted to the baffle 4. Various motors may be used as the motor 50. In this embodiment, a DC motor is used as the motor 50 and thus its control is easy. The motor 50 outputs only rotation in one direction around the motor axial line. In this embodiment, the motor 50 is rotated only in a direction for turning the baffle 4 to one side "LCW" (open direction) around the turning center axial line "L". In other words, the motor 50 outputs only a rotation driving force for driving a drive wheel 6 described below to one side "L1CCW" around the first axial line "L1".

(Structure of Rotation Transmission Mechanism 10)

Figure 4:
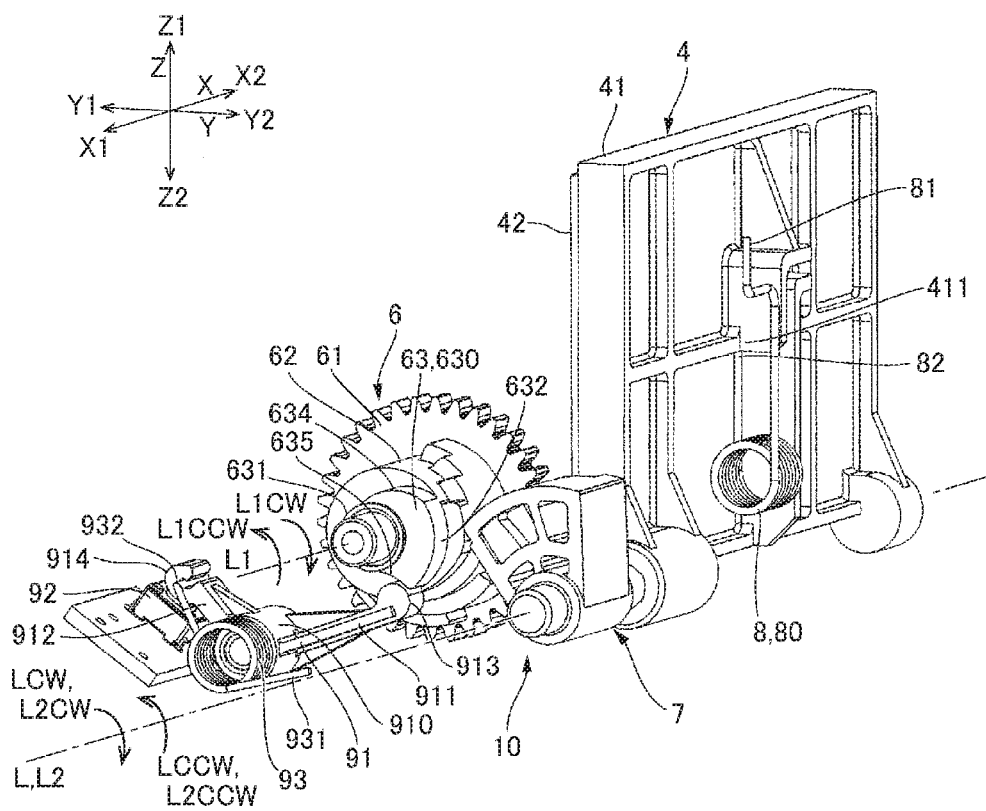
FIG. 4 is a perspective view showing a rotation transmission mechanism and the like used in the damper device shown in FIG. 1.

FIG. 4 is a perspective view showing the rotation transmission mechanism 10 and the like used in the damper device 1 shown in FIG. 1. As shown in FIG. 4, the rotation transmission mechanism 10 includes a drive wheel 6, which is rotated to one side "L1CCW" around the first axial line "L1" extended in the "X" direction in parallel to the turning center axial line "L" of the baffle 4, a driven wheel 7 which is driven and turned by the drive wheel 6 to one side "L2CW" around the second axial line "L2" parallel to the first axial line "L1", and an urging member 8 which urges the driven wheel 7 to the other side "L2CCW" around the second axial line "L2". In this embodiment, the driven wheel 7 is connected with the baffle 4. Therefore, the turning center axial line (second axial line "L2") of the driven wheel 7 is coincided with the turning center axial line "L" of the baffle 4. Therefore, in the rotation transmission mechanism 10, when the drive wheel 6 is turned to one side "L1CCW" around the first axial line "L1", the driven wheel 7 is turned to one side "L2CW" around the second axial line "L2" and the baffle 4 is turned to one side "LCW" around the turning center axial line "L" and thus the baffle 4 is set in an open posture. On the other hand, even in a case that the drive wheel 6 is turned to one side "L1CCW" around the first axial line "L1", when turning of the driven wheel 7 by the drive wheel 6 is stopped, the driven wheel 7 is turned to the other side "L2CCW" around the second axial line "L2" by an urging force of the urging member 8. Therefore, the baffle 4 is turned to the other side "LCCW" around the turning center axial line "L" to be set in a closing posture, and further turning of the baffle 4 to the other side "LCCW" around the turning center axial line "L" is prevented by a stopper or the like provided in the frame 2.

As shown in FIGS. 2 and 4, the urging member 8 is a torsion coil spring 80 whose end parts 81 and 82 are respectively held by an engaging part 211 formed on an inner wall 210 of the tube part 21 of the frame 2 and an engaging part 411 formed on a rear face side (opposite side to the elastic member 42) of the opening and closing plate 41 of the baffle 4. The urging member 8 (torsion coil spring 80) urges the baffle 4 to the other side "LCCW" (closing direction) around the turning center axial line "L" and thereby the driven wheel 7 is urged to the other side "L2CCW" around the second axial line "L2".

The rotation transmission mechanism 10 includes a position sensor 9 structured to monitor an angular position of the drive wheel 6 or the driven wheel 7 (baffle 4) as described below.

(Structure of Drive Wheel 6 and Driven Wheel 7)

Figure 5:
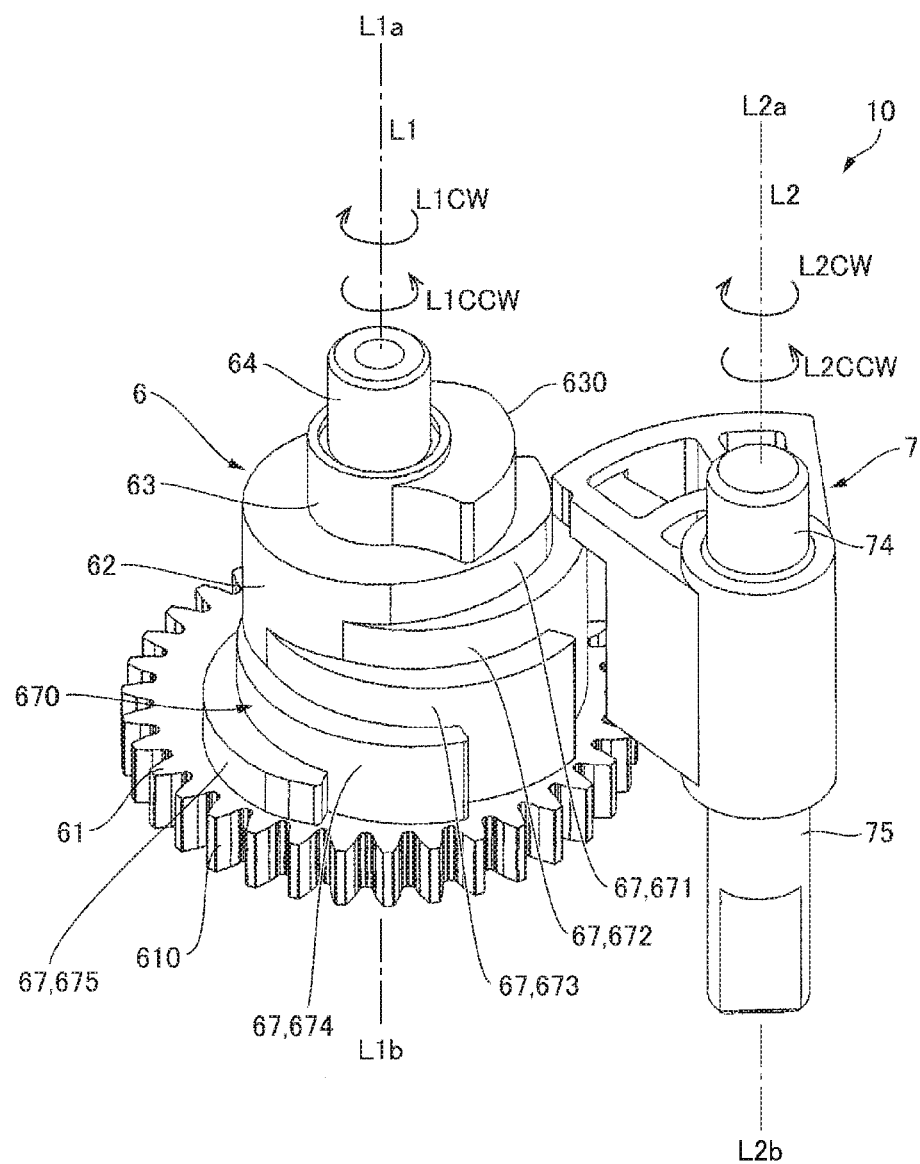
FIG. 5 is a perspective view showing a drive wheel and a driven wheel used in the rotation transmission mechanism shown in FIG. 4 which are viewed from one side.
Figure 6:
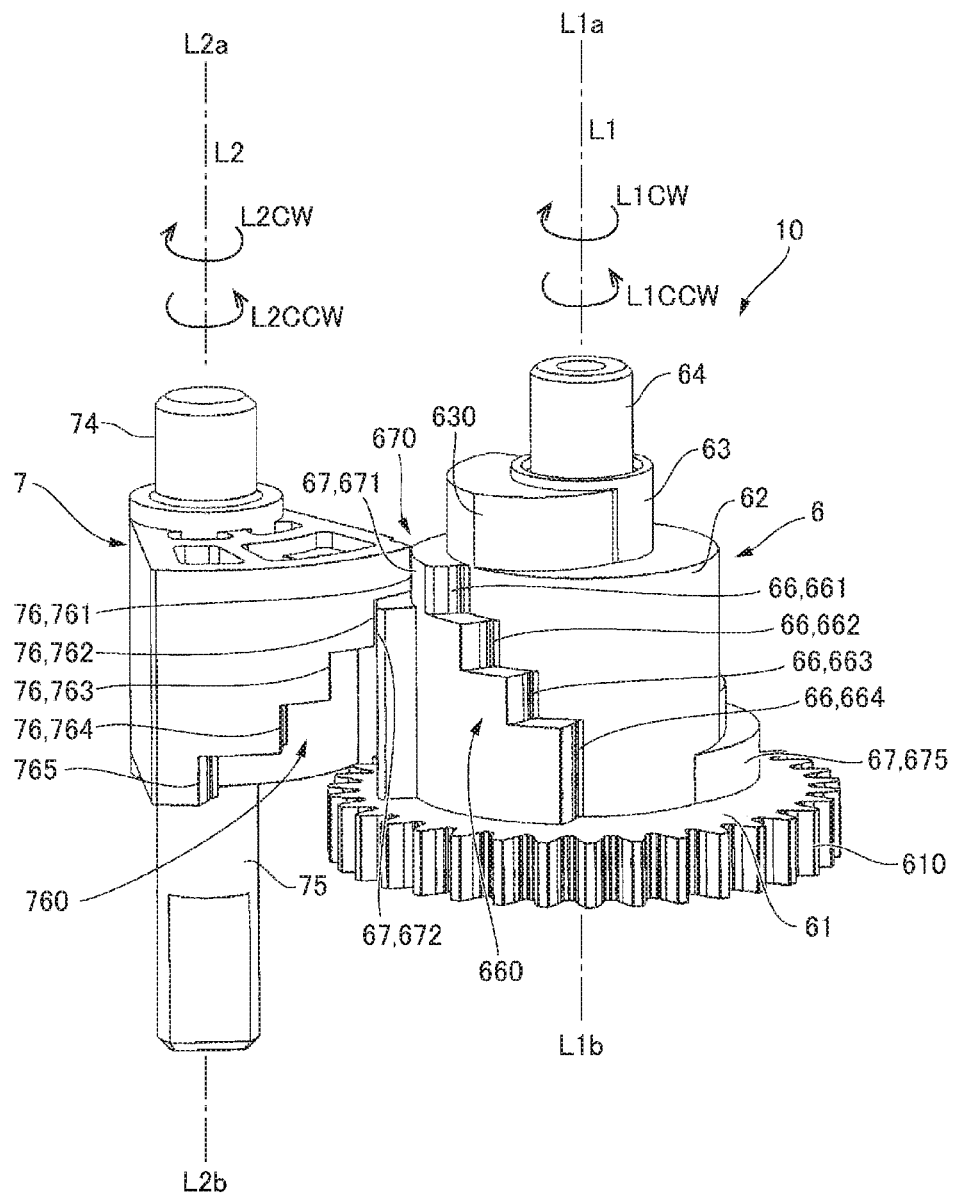
FIG. 6 is a perspective view showing the drive wheel and the driven wheel shown in FIG. 5 which are viewed from the other side.
Figure 7:
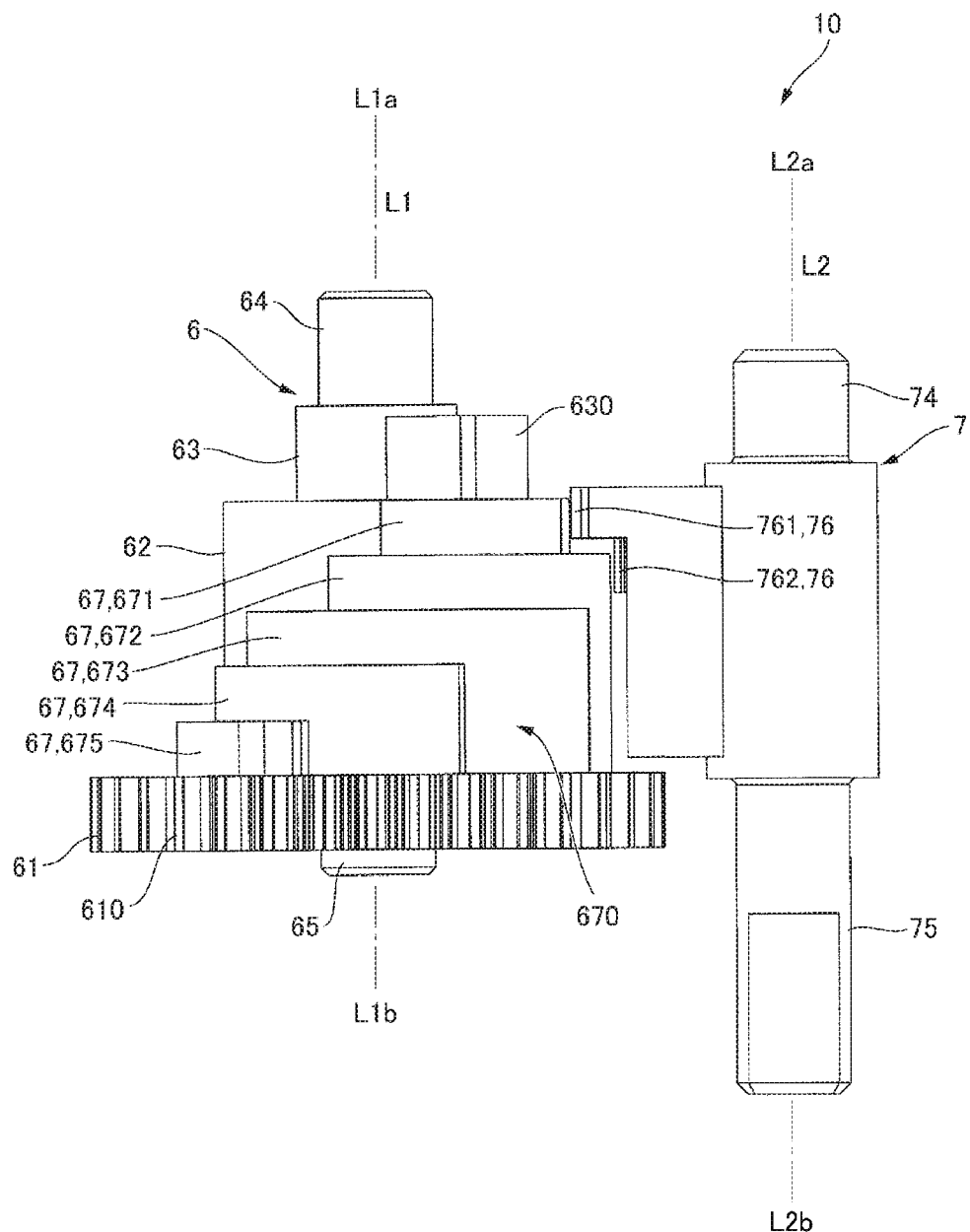
FIG. 7 is a side view showing the drive wheel and the driven wheel shown in FIG. 5 which are viewed from one side.
Figure 8:
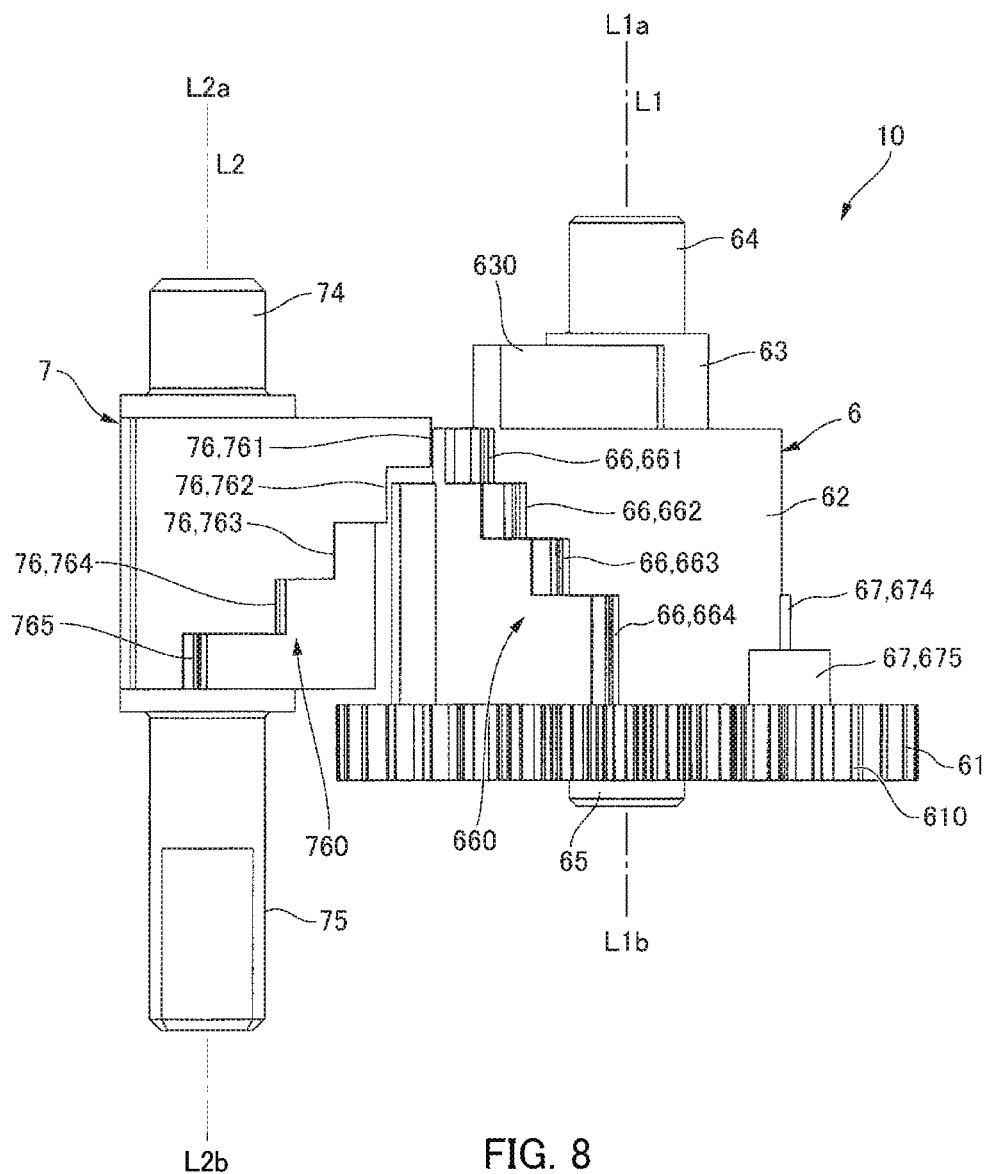
FIG. 8 is a side view showing the drive wheel and the driven wheel shown in FIG. 5 which are viewed from the other side.
Figure 9:
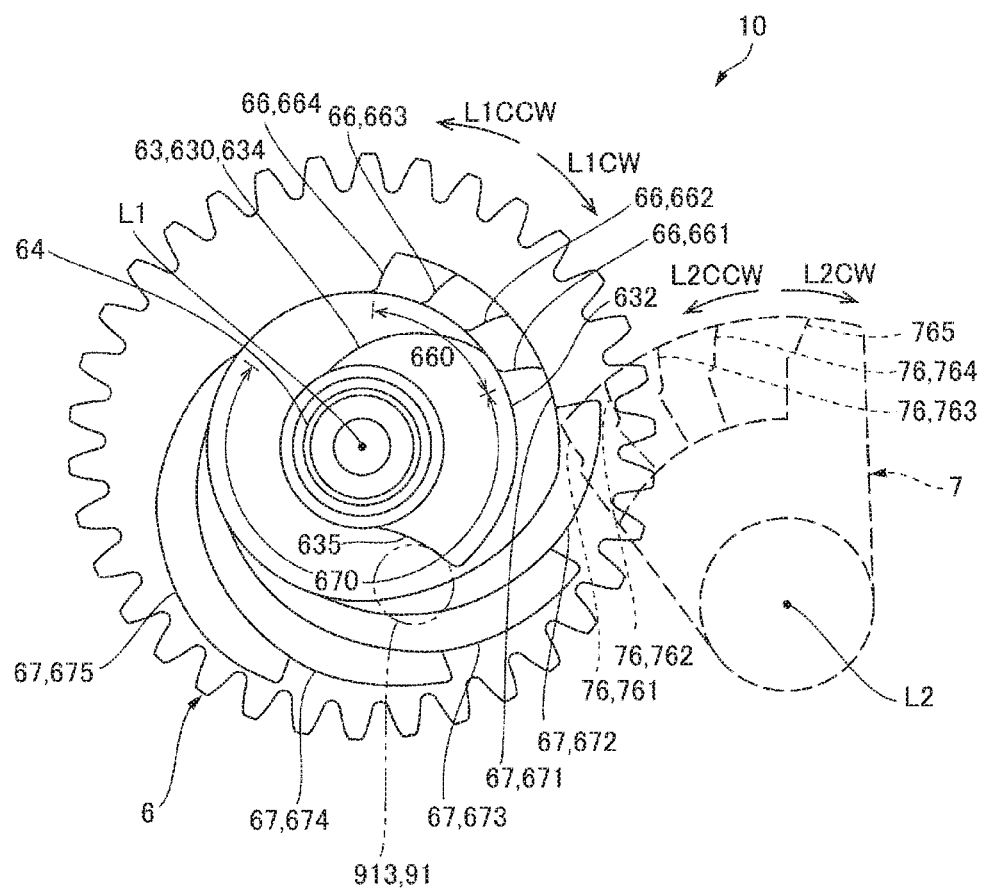
FIG. 9 is an explanatory view showing a planar structure of the drive wheel and the driven wheel shown in FIG. 5.

FIG. 5 is a perspective view showing the drive wheel 6 and the driven wheel 7 used in the rotation transmission mechanism 10 shown in FIG. 4 which are viewed from one side. FIG. 6 is a perspective view showing the drive wheel 6 and the driven wheel 7 shown in FIG. 5 which are viewed from the other side. FIG. 7 is a side view showing the drive wheel 6 and the driven wheel 7 shown in FIG. 5 which are viewed from one side. FIG. 8 is a side view showing the drive wheel 6 and the driven wheel 7 shown in FIG. 5 which are viewed from the other side. FIG. 9 is an explanatory view showing a planar structure of the drive wheel 6 and the driven wheel 7 shown in FIG. 5.

As shown in FIGS. 5 through 9, the drive wheel 6 is provided with a circular plate part 61 whose outer peripheral face is formed with a gear 610, a first body part 62 in a columnar shape which is protruded from the center of the circular plate part 61 to one side "L1a" in the first axial line "L1" direction, a second body part 63 in a columnar shape which is protruded from the center of the first body part 62 to one side "L1a" in the first axial line "L1" direction, and a shaft part 64 in a columnar shape which is protruded from the center of the second body part 63 to one side "L1a" in the first axial line "L1" direction. Further, the drive wheel 6 is provided with a shaft part 65 (see FIGS. 7 and 8) which is protruded from the center of the circular plate part 61 to the other side "L1b" in the first axial line "L1" direction. The shaft parts 64 and 65 are rotatably supported by the cover 3 and the partition 22 of the frame 2. The gear 610 is meshed with a small diameter gear of the composite gear 57 shown in FIG. 3 and the like.

The drive wheel 6 is provided with a drive teeth forming part 660 where a plurality of drive teeth 66 structured to turn the driven wheel 7 to one side "L2CW" around the second axial line "L2" is disposed in a circumferential direction, and a cam face forming part 670 on which the driven wheel 7 is slid when the driven wheel 7 is turned to the other side "L2CCW" around the second axial line "L2" by the urging force of the urging member 8. The drive teeth forming part 660 and the cam face forming part 670 are provided so as to be adjacent to each other in the circumferential direction.

On the other hand, the driven wheel 7 is provided with a driven teeth forming part 760 where a plurality of driven teeth 76 with which the drive teeth 66 are abutted in order when the drive wheel 6 is turned to one side "L1CCW" around the first axial line "L1" is disposed in the circumferential direction. In this embodiment, the driven wheel 7 is a sector gear and the driven teeth forming part 760 is structured by using its outer peripheral face. In the driven wheel 7, a shaft part 74 protruded to one side "L2a" in the second axial line "L2" direction and a shaft part 75 protruded to the other side "L2b" in the second axial line "L2" direction are formed at a center of the fan shape, and the shaft parts 74 and 75 are turnably supported by the cover 3 and the partition 22 of the frame 2.

(Detailed Structure of Drive Teeth 66 and Driven Teeth 76)

In the rotation transmission mechanism 10 in this embodiment, the drive wheel 6 is structured so that a plurality of drive teeth 66 is disposed at different positions in the first axial line "L1" direction and is formed in a multi-stage shape along the first axial line "L1" direction. A plurality of driven teeth 76 is provided at different positions in the second axial line "L2" direction so as to correspond to the structure of the drive teeth 66 of the drive wheel 6, and is formed in a multi-stage shape along the second axial line "L2" direction.

In this embodiment, the drive wheel 6 is formed with totaled four (4) drive teeth 66 (first drive tooth 661, second drive tooth 662, third drive tooth 663 and fourth drive tooth 664) in a multi-stage shape along the first axial line "L1" direction. The four drive teeth 66 are respectively formed one by one at predetermined positions in the first axial line "L1" direction and, when viewed in the first axial line "L1" direction, the four drive teeth 66 are formed at equal angular intervals.

In the four drive teeth 66, the first drive tooth 661 formed on the most one side "L1a" in the first axial line "L1" direction is disposed on the most other side "L1CW" around the first axial line "L1", and the second drive tooth 662, the third drive tooth 663 and the fourth drive tooth 664 are disposed in this order along the one side "L1CCW" around the first axial line "L1" with respect to the first drive tooth 661. Therefore, in the four drive teeth 66, the fourth drive tooth 664 formed on the most other side "L1b" in the first axial line "L1" direction is located on the most one side "L1CCW" around the first axial line "L1". Accordingly, in the plurality of the drive teeth 66, the drive tooth 66 located on one side "L1a" in the first axial line "L1" direction is located on the other side "L1CW" around the first axial line "L1" with respect to the drive tooth 66 located on the other side "L1b" in the first axial line "L1" direction.

In this embodiment, the drive teeth 66 of the drive wheel 6 drive the driven wheel 7 only when the drive wheel 6 is turned to one side "L1CCW" around the first axial line "L1". Therefore, each of the four drive teeth 66 is formed so that a face on the one side "L1CCW" around the first axial line "L1" is provided with a tooth face having an involute curve, and that a face from an end part on an outer side in a radial direction (tooth tip) of each of the four drive teeth 66 to the other side "L1CW" around the first axial line "L1" is formed to be a circular peripheral face which is continuously extended from the end part on the outer side in the radial direction of each of the four drive teeth 66. Further, the cam face forming part 670 is structured on a circular peripheral face formed on the other side "L1CW" around the first axial line "L1" with respect to the drive teeth forming part 660. In this embodiment, each of the faces on the one side "L1CCW" around the first axial line "L1" of the second drive tooth 662, the third drive tooth 663 and the fourth drive tooth 664 of the four drive teeth 66 is formed to be a tooth face having a simple involute curve. On the other hand, the face of the first drive tooth 661 on one side "L1CCW" around the first axial line "L1" is formed so that a curvature radius of the end part on the outer side in the radial direction is increased with an involute curve as a basis. Therefore, when an operation described below is performed, transfer from a position just before a full open state to the full open position can be performed smoothly. Further, a direction to which a force is applied is not rapidly changed and thus momentary impact noise or the like can be reduced.

The driven wheel 7 is formed with totaled four (4) driven teeth 76 (first driven tooth 761, second driven tooth 762, third driven tooth 763 and fourth driven tooth 764) in a multi-stage shape along the second axial line "L2" direction. When viewed in a direction perpendicular to the first axial line "L1" and the second axial line "L2", the four driven teeth 76 (first driven tooth 761, second driven tooth 762, third driven tooth 763 and fourth driven tooth 764) are respectively overlapped with the four drive teeth 66 (first drive tooth 661, second drive tooth 662, third drive tooth 663 and fourth drive tooth 664). In this embodiment, the totaled four (4) driven teeth 76 (first driven tooth 761, second driven tooth 762, third driven tooth 763 and fourth driven tooth 764) are respectively formed one by one at predetermined positions in the second axial line "L2" direction and, when viewed in the second axial line "L2" direction, the four driven teeth 76 are formed at equal angular intervals.

In the four driven teeth 76, the first driven tooth 761 formed on the most one side "L2a" in the second axial line "L2" direction is disposed on the most other side "L2CCW" around the second axial line "L2", and the second driven tooth 762, the third driven tooth 763 and the fourth driven tooth 764 are disposed in this order toward the one side "L2CW" around the second axial line "L2" from the first driven tooth 761. Therefore, in the four driven teeth 76, the fourth driven tooth 764 formed on the most other side "L2b" in the second axial line "L2" direction is located on the most one side "L2CW" around the second axial line "L2". Accordingly, in the plurality of the driven teeth 76, the driven tooth 76 located on one side "L2a" in the second axial line "L2" direction is located on the other side "L2CCW" around the second axial line "L2" with respect to the driven tooth 76 located on the other side "L2b" in the second axial line "L2" direction.

In this embodiment, the drive teeth 66 are abutted with the driven teeth 76 only from the other side "L2CCW" around the second axial line "L2". Therefore, each of the four driven teeth 76 (first driven tooth 761, second driven tooth 762, third driven tooth 763 and fourth driven tooth 764) is formed so that a face on the other side "L2CCW" around the second axial line "L2" is provided with a tooth face having an involute curve, and that a portion from end parts (tooth tip) on an outer side in the radial direction of the four driven teeth 76 to the one side "L2CW" around the second axial line "L2" is formed to be a circular peripheral face which is continuously extended from the end parts on the outer side in the radial direction of the four driven teeth 76.

Further, the driven teeth forming part 760 of the driven wheel 7 is provided with a final driven tooth 765 on one side "L2CW" around the second axial line "L2" with respect to the plurality of the driven teeth 76 and on the other side "L2b" in the second axial line "L2" direction with respect to the plurality of the driven teeth 76 so as not to abut with the drive teeth 66 when the drive wheel 6 is turned to one side "L1CCW" around the first axial line "L1".

In this embodiment, respective pitches of the plurality of the driven teeth 76 are equal to each other. On the other hand, a pitch between the fourth driven tooth 764 located on the most one side "L2CW" around the second axial line "L2" and the final driven tooth 765 is wider than the pitch of the plurality of the driven teeth 76. For example, the pitch between the fourth driven tooth 764 and the final driven tooth 765 is set in a range from 1.1 times to 1.8 times of the pitch of the plurality of the driven teeth 76. In this embodiment, the pitch between the fourth driven tooth 764 and the final driven tooth 765 is set to 1.25 times of the pitch of the plurality of the driven teeth 76.

(Detailed Structure of Cam Face Forming Part)

In the drive wheel 6, the cam face forming part 670 is disposed with a plurality of cam faces 67 on which the driven teeth 76 are sequentially slid when the driven wheel 7 is turned to the other side "L2CCW" around the second axial line "L2" by an urging force of the urging member 8 at different positions in the first axial line "L1" direction. The plurality of the cam faces 67 is formed in a multi-stage shape along the first axial line "L1" direction.

In this embodiment, the cam face forming part 670 is formed with four cam faces 67 (first cam face 671, second cam face 672, third cam face 673 and fourth cam face 674) so as to correspond to the four driven teeth 76. Further, the cam face forming part 670 is provided with a final cam face 675 with which the final driven tooth 765 of the driven wheel 7 is abutted. Therefore, the cam face forming part 670 is formed with totaled five (5) cam faces 67. When viewed in a direction perpendicular to the first axial line "L1" and the second axial line "L2", the five cams faces 67 (first cam face 671, second cam face 672, third cam face 673, fourth cam face 674 and final cam face 675) are respectively overlapped with the four driven teeth 76 (first driven tooth 761, second driven tooth 762, third driven tooth 763 and fourth driven tooth 764) and the final driven tooth 765.

In the five cam faces 67, the first cam face 671 formed on the most one side "L1a" in the first axial line "L1" direction is disposed on the most one side "L1CCW" around the first axial line "L1". The second cam face 672, the third cam face 673, the fourth cam face 674 and the final cam face 675 are disposed in this order along the other side "L1CW" around the first axial line "L1" with respect to the first cam face 671. Therefore, in the five cam faces 67, the final cam face 675 formed on the most other side "L1b" in the first axial line "L1" direction is located on the most other side "L1CW" around the first axial line "L1". Accordingly, in the plurality of the cam faces 67, the cam face 67 located on one side "L1a" in the first axial line "L1" direction is located on one side "L1CCW" around the first axial line "L1" with respect to the cam face 67 located on the other side "L1b" in the first axial line "L1" direction.

Each of the five cam faces 67 is formed of a circular arc face which is extended in a circular arc shape from one side "L1CCW" around the first axial line "L1" to the other side "L1CW" and the driven teeth 76 are slid on parts of the five cam faces 67 in the circumferential direction. Therefore, cam faces adjacent to each other in the circumferential direction of the five cam faces 67 are overlapped with each other over a certain angular range. In this embodiment, the first cam face 671 is extended in the circumferential direction from the end part on the outer side in the radial direction of the first drive tooth 661. Further, in each of the plurality of the cam faces 67, its end part on the most one side "L1CCW" around the first axial line "L1" is located on an outer side in the radial direction with respect to the adjacent cam face 67 on one side "L1CCW" around the first axial line "L1".

In this embodiment, a diameter of each of the five cam faces 67 is reduced from one side "L1CCW" around the first axial line "L1" toward the other side "L1CW" and is reached to an outer peripheral face of the first body part 62 which is located on an extended line of tooth bottoms of the drive teeth 66. Further, in the final cam face 675, a reducing rate of an outer diameter in the circumferential direction of a portion located on one side "L1CCW" around the first axial line "L1" is smaller than that of other cam faces 67 (first cam face 671, second cam face 672, third cam face 673 and fourth cam face 674). In addition, a reducing rate of an outer diameter in the circumferential direction of a portion of the final cam face 675 located on the other side "L1CW" around the first axial line "L1" is larger than that of other cam faces 67. Further, in the second cam face 672, an end part on the most one side "L1CCW" around the first axial line "L1" is located on an inner side in the radial direction with respect to the cam faces 67 (third cam face 673, fourth cam face 674 and final cam face 675) provided on the other side "L1CW" around the first axial line "L1". Therefore, when an operation described below is to be performed, the third driven tooth 763, the fourth driven tooth 764 and the final driven tooth 765 which are disposed in a latter stage to the second driven tooth 762 are not interfered with a portion extended from the second cam face 672 to the other side "L1b" in the first axial line "L1" direction.

Figure 10:
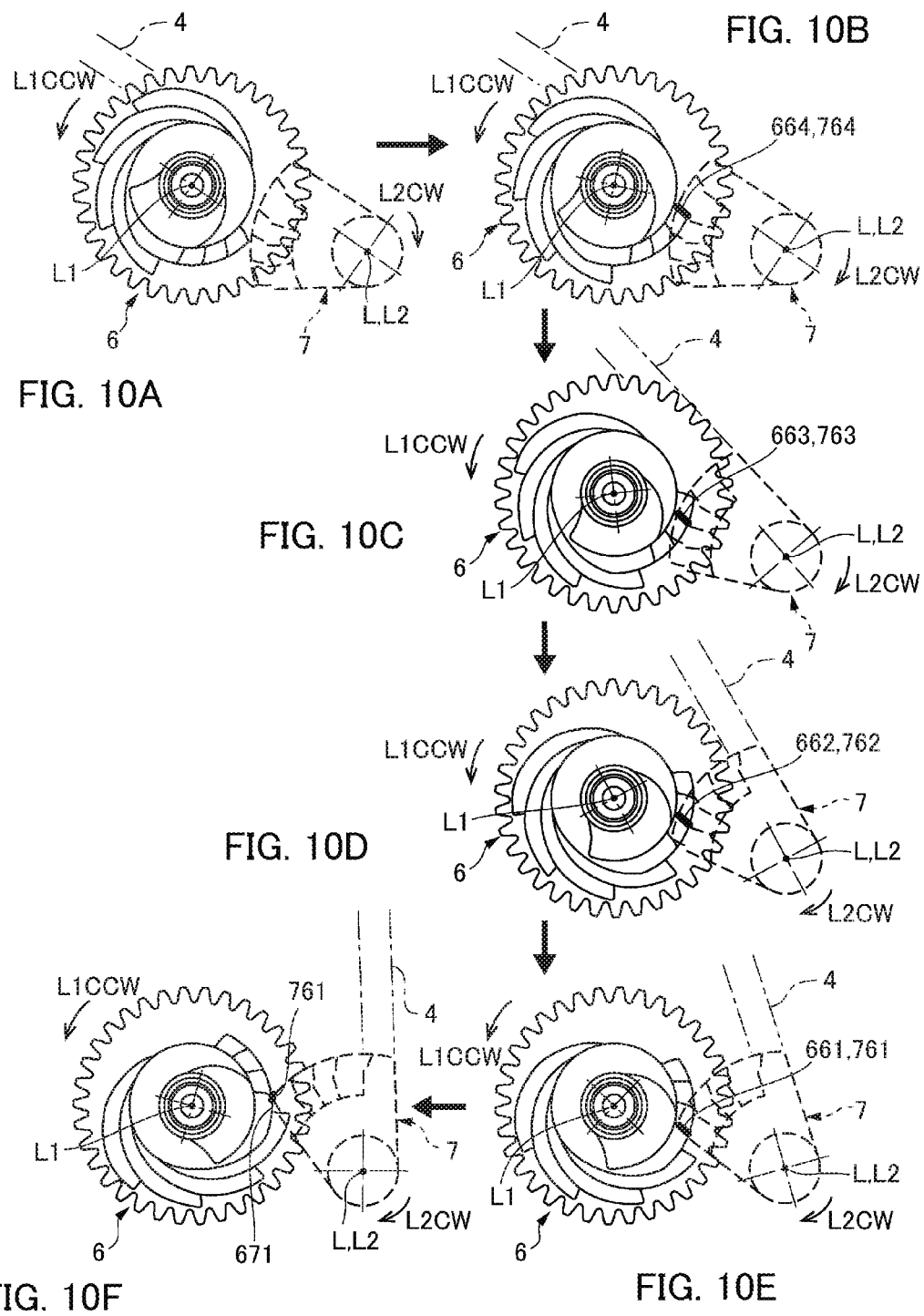
FIGS. 10A through 10F are explanatory views showing states that the driven wheel shown in FIG. 5 is turned to one side around a second axial line.
Figure 11:
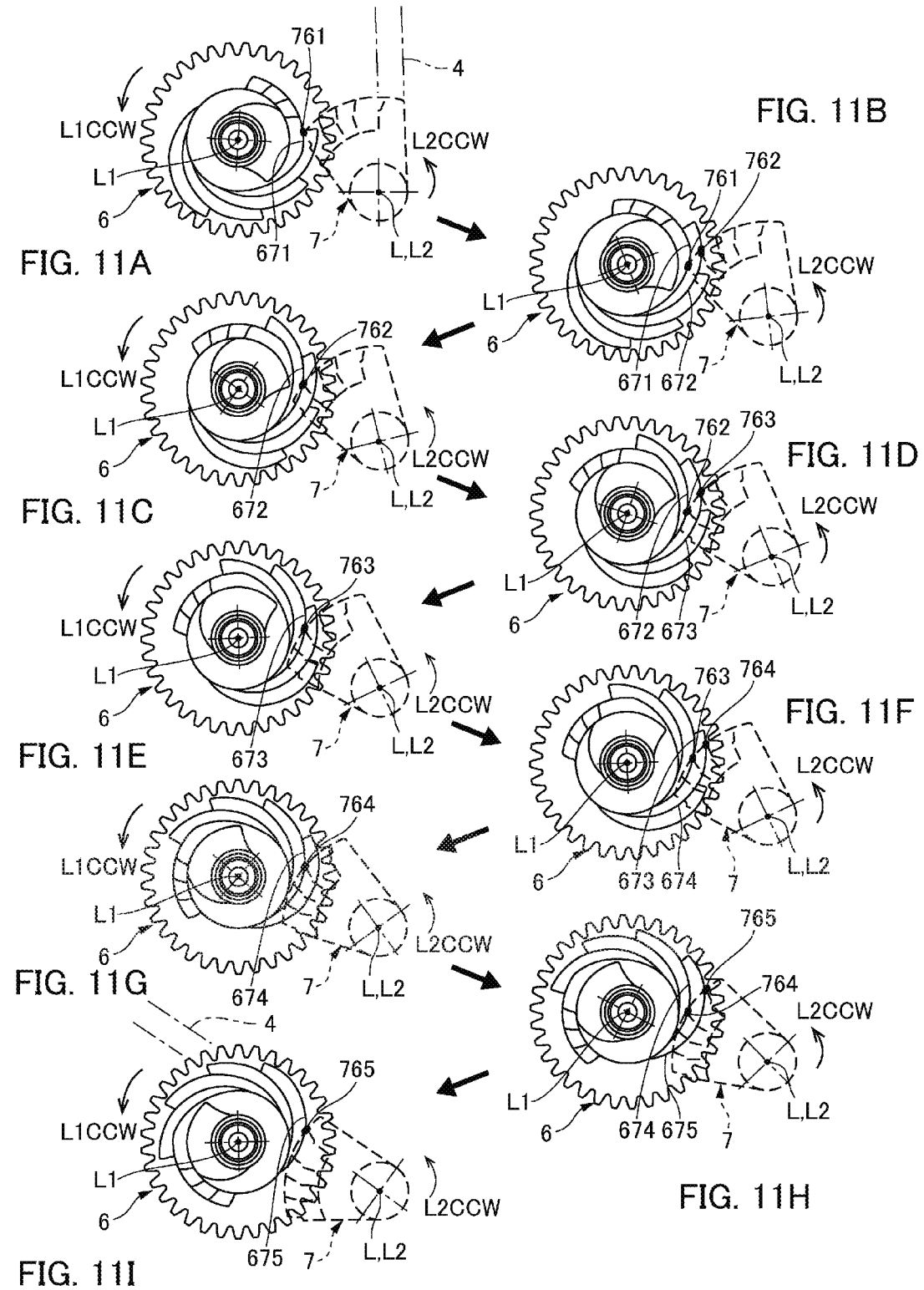
FIGS. 11A through 11I are explanatory views showing states that the driven wheel shown in FIG. 5 is turned to the other side around the second axial line.

Further, in this embodiment, as described below with reference to FIGS. 9 through 10F, it is structured that, in respective regions where the plurality of the driven teeth 76 is sequentially slid on the plurality of the cam faces 67, the subsequent driven tooth 76 or the final driven tooth 765 for the next region is contacted with the cam face 67 while the driven tooth 76 in the current region has been contacted with the cam face.

(Structure of Position Sensor 9)

As shown in FIG. 4, the rotation transmission mechanism 10 in this embodiment includes a position sensor 9 structured to monitor an angular position of the drive wheel 6 or the driven wheel 7 (baffle 4). In this embodiment, the position sensor 9 is structured to monitor an angular position of the drive wheel 6.

The position sensor 9 includes a turnable lever 91 which is displaced by a sensor cam face 630 provided in the second body part 63 of the drive wheel 6 and a switch 92 whose state is turned on and off by displacement of the turnable lever 91. The sensor cam face 630 is provided with a small diameter part 631, a diameter enlarging part 634, a large diameter part 632 and a diameter reducing part 635 along the other side "L1CW" around the first axial line "L1".

The switch 92 is, for example, a tact switch. The turnable lever 91 is provided with a support shaft 910 which is turnably supported by a cylindrical tube part formed in the partition 22 of the frame 2, a first arm part 911 which is protruded from the support shaft 910 toward the sensor cam face 630 of the drive wheel 6, and a second arm part 912 which is protruded from the support shaft 910 toward the switch 92. A tip end of the first arm part 911 is formed to be a first abutting part 913 in a circular shape which slides on the sensor cam face 630, and a tip end of the second arm part 912 is formed to be a second abutting part 914 which is capable of abutting with the switch 92.

A torsion coil spring 93 which is supported by the cover 3 is provided for the turnable lever 91. One end part 931 of the torsion coil spring 93 is supported by the cover 3, and the other end part 932 of the torsion coil spring 93 is supported by a tip end of the second arm part 912 of the turnable lever 91. Therefore, the tip end part (second abutting part 914) of the second arm part 912 is urged toward the switch 92 by the torsion coil spring 93. Accordingly, in a region where the tip end (first abutting part 913) of the first arm part 911 is abutted with the small diameter part 631 of the sensor cam face 630, the second abutting part 914 of the second arm part 912 presses the switch 92. On the other hand, in a region where the tip end (first abutting part 913) of the first arm part 911 is abutted with the large diameter part 632 of the sensor cam face 630, the second abutting part 914 of the second arm part 912 is separated from the switch 92. Therefore, when an on/off state of the switch 92 is monitored, an angular position of the drive wheel 6 is detected and thus an angular position of the driven wheel 7 and the baffle 4 can be monitored.

In this embodiment, the position sensor 9 is structured so that, as described below with reference to FIG. 12, after the driven wheel 7 is turned to the most one side "L2CW" around the second axial line "L2", an output from the switch 92 is switched at a midway position of a first region where the driven wheel 7 is stopped and, after the driven wheel 7 is turned to the most other side "L2CCW" around the second axial line "L2", the output from the switch 92 is switched at a midway position of a second region where the driven wheel 7 is stopped.

(Operation of Rotation Transmission Mechanism 10)

Figure 12:
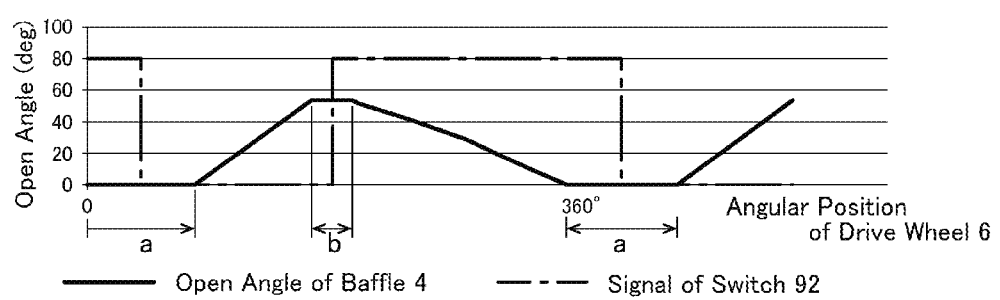
FIG. 12 is an explanatory view showing a relationship between an angular position of the drive wheel shown in FIG. 5 and an open angle of a baffle.

With reference to FIGS. 10A through 12, an operation will be described below in which the driven wheel 7 is turned to one side "L2CW" around the second axial line "L2" and then the driven wheel 7 is turned to the other side "L2CCW" around the second axial line "L2" by rotating the drive wheel 6 to one side "L1CCW" around the first axial line "L1". FIGS. 10A through 10F are explanatory views showing the states that the driven wheel 7 shown in FIG. 5 is turned to one side "L2CW" around the second axial line "L2". FIGS. 11A through 11I are explanatory views showing states that the driven wheel 7 shown in FIG. 5 is turned to the other side "L2CCW" around the second axial line "L2". FIG. 12 is an explanatory view showing a relationship between an angular position of the drive wheel 6 shown in FIG. 5 and an open angle of the baffle 4. In FIG. 12, an open angle of the baffle 4 is indicated by a solid line and a change of an output from the switch 92 of the position sensor 9 is indicated by an alternate long and short dash line. Further, in FIGS. 10A through 10F and FIGS. 11A through 11I, contacted portions of the drive wheel 6 with the driven wheel 7 are indicated by a thick line or a black dot.

FIG. 10A shows a state that the baffle 4 is set in a closing posture where the driven wheel 7 is stopped after the driven wheel 7 has been turned to the most other side "L2CCW" around the second axial line "L2". In this state, the baffle 4 is urged in the closing direction by the urging member 8 shown in FIG. 4 and the like. However, the baffle 4 is prevented from being further turned in the closing direction by a stopper provided for the baffle 4 or the like.

In this state, even when the motor 50 shown in FIG. 3 is operated and the drive wheel 6 is turned to one side "L1CCW" around the first axial line "L1", in a region (region "a" shown in FIG. 12) until the fourth drive tooth 664 of the drive wheel 6 is abutted with the fourth driven tooth 764 of the driven wheel 7 as shown in FIG. 10B, the driven wheel 7 and the baffle 4 continues the stopped state.

Next, when the fourth drive tooth 664 of the drive wheel 6 is abutted with the fourth driven tooth 764 of the driven wheel 7, the driven wheel 7 begins to turn to one side "L2CW" around the second axial line "L2" against the urging force of the urging member 8. Therefore, the baffle 4 is turned to one side "LCW" (open direction) around the turning center axial line "L". Next, when the drive wheel 6 is further turned to one side "L1CCW" around the first axial line "L1", as shown in FIG. 10C, the third drive tooth 663 of the drive wheel 6 is abutted with the third driven tooth 763 of the driven wheel 7 and the driven wheel 7 is turned to one side "L2CW" around the second axial line "L2" against the urging force of the urging member 8. Therefore, the baffle 4 is further turned to one side "LCW" (open direction) around the turning center axial line "L". Next, when the drive wheel 6 is further turned to one side "L1CCW" around the first axial line "L1", as shown in FIG. 10D, the second drive tooth 662 of the drive wheel 6 is abutted with the second driven tooth 762 of the driven wheel 7 and the driven wheel 7 is turned to one side "L2CW" around the second axial line "L2" against the urging force of the urging member 8. Therefore, the baffle 4 is further turned to one side "LCW" (open direction) around the turning center axial line "L". Next, when the drive wheel 6 is further turned to one side "L1CCW" around the first axial line "L1", as shown in FIG. 10E, the first drive tooth 661 of the drive wheel 6 is abutted with the first driven tooth 761 of the driven wheel 7 and the driven wheel 7 is turned to one side "L2CW" around the second axial line "L2" against the urging force of the urging member 8. Therefore, the baffle 4 is further turned to one side "LCW" (open direction) around the turning center axial line "L". Then, when the drive wheel 6 is further turned to one side "L1CCW" around the first axial line "L1", as shown in FIG. 10F, the driven wheel 7 is turned to one side "L2CW" around the second axial line "L2" against the urging force of the urging member 8 until a tooth tip of the first drive tooth 661 of the drive wheel 6 rides on a tooth tip of the first driven tooth 761 of the driven wheel 7 and the baffle 4 is set in an open posture.

Next, as shown in FIG. 11A, when the drive wheel 6 is turned to one side "L1CCW" around the first axial line "L1", engagement of the first drive tooth 661 of the drive wheel 6 with the first driven tooth 761 of the driven wheel 7 is released and thus, the driven wheel 7 is going to turn to the other side "L2CCW" around the second axial line "L2" by the urging force of the urging member 8 shown in FIG. 4 and the like. However, the first driven tooth 761 is abutted with the first cam face 671 and thus the driven wheel 7 is prevented from being turned to the other side "L2CCW" around the second axial line "L2" and a state is maintained that the driven wheel 7 is stopped on the most one side "L2CW" around the second axial line "L2" (region "b" shown in FIG. 12). Therefore, the baffle 4 is also stopped in an open posture.

Next, even when the drive wheel 6 is further turned to one side "L1CCW" around the first axial line "L1", the driven wheel 7 and the baffle 4 continue the stop state until the first driven tooth 761 is reached to a portion where a diameter of the first cam face 671 is reduced on the other side "L1CW" around the first axial line "L1" of the first cam face 671. On the other hand, in the position sensor 9 shown in FIG. 4, the first abutting part 913 of the turnable lever 91 is moved from the large diameter part 632 of the sensor cam face 630 to the small diameter part 631 through the diameter reducing part 635 at a midway position of a stop region (region "b" shown in FIG. 12). Therefore, an output from the switch 92 is turned from off to on.

Next, when the drive wheel 6 is further turned to one side "L1CCW" around the first axial line "L1" and the first driven tooth 761 is reached to a portion of the first cam face 671 where the diameter of the first cam face 671 is reduced on the other side "L1CW" around the first axial line "L1", the driven wheel 7 begins to turn to the other side "L2CCW" around the second axial line "L2" by the urging force of the urging member 8 shown in FIG. 4 and the like. Therefore, the baffle 4 begins to turn to the other side "LCCW" (closing direction) around the turning center axial line "L".

Next, as shown in FIG. 11B, when the drive wheel 6 is further turned to the one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, in a state that the first driven tooth 761 is contacted with the first cam face 671, the second driven tooth 762 is contacted with the second cam face 672. Next, as shown in FIG. 11C, when the drive wheel 6 is further turned to the one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, the second driven tooth 762 slides on the second cam face 672.

Next, as shown in FIG. 11D, when the drive wheel 6 is further turned to one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, the third driven tooth 763 is contacted with the third cam face 673 in a state that the second driven tooth 762 is contacted with the second cam face 672. Next, as shown in FIG. 11E, when the drive wheel 6 is further turned to the one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, the third driven tooth 763 slides on the third cam face 673.

Next, as shown in FIG. 11F, when the drive wheel 6 is further turned to the one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, the fourth driven tooth 764 is contacted with the fourth cam face 674 in a state that the third driven tooth 763 is contacted with the third cam face 673. Next, as shown in FIG. 11G, when the drive wheel 6 is further turned to the one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, the fourth driven tooth 764 slides on the fourth cam face 673.

Next, as shown in FIG. 11H, when the drive wheel 6 is further turned to the one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, the final driven tooth 765 is contacted with the final cam face 675 in a state that the fourth driven tooth 764 is contacted with the fourth cam face 674. Next, as shown in FIG. 11I, when the drive wheel 6 is further turned to the one side "L1CCW" around the first axial line "L1", the driven wheel 7 is turned to the other side "L2CCW" around the second axial line "L2" by the urging force of the urging member 8 and the baffle 4 is turned to the other side "LCCW" (closing direction) around the turning center axial line "L". In this case, the final driven tooth 765 slides on the final cam face 673.

Next, when the drive wheel 6 is further turned to the one side "L1CCW" around the first axial line "L1", the driven wheel 7 is turned to the other side "L2CCW" around the second axial line "L2" until the final driven tooth 765 is separated from the final cam face 675 and then the driven wheel 7 is stopped. Therefore, the baffle 4 is stopped in the closing posture. Meanwhile, even when the drive wheel 6 is further turned to one side "L1CCW" around the first axial line "L1", the driven wheel 7 and the baffle 4 continue the stopped state (region "a" shown in FIG. 12) until the fourth drive tooth 664 is abutted with the fourth driven tooth 764 as shown in FIG. 10B. In this case, at a midway position of the stop region "a", the first abutting part 913 of the turnable lever 91 used in the position sensor 9 shown in FIG. 4 is moved from the small diameter part 631 of the sensor cam face 630 to the large diameter part 632 through the diameter enlarging part 634. Therefore, an output from the switch 92 is turned from on to off.

After that, when the drive wheel 6 is further turned to one side "L1CCW" around the first axial line "L1", the above-mentioned operation is repeated.

(Principal Effects in this Embodiment)

As described above, in the rotation transmission mechanism 10 and the damper device 1 in this embodiment, when the drive wheel 6 is turned to one side "L1CCW" around the first axial line "L1", the drive teeth 66 drive the driven wheel 7 to one side "L2CW" around the second axial line "L2" through the driven teeth 76. After that, engagement of the drive teeth 66 and the driven teeth 76 is released, the driven wheel 7 is turned to the other side "L2CCW" around the second axial line "L2" by the urging force of the urging member 8. In this case, the driven wheel 7 slides on the cam face forming part 670 which is provided in the drive wheel 6. Therefore, even when the drive wheel 6 is rotated only to one side "L1CCW" around the first axial line "L1", the driven wheel 7 is turned to one side "L2CW" around the second axial line "L2" and, in addition, the driven wheel 7 is turned to the other side "L2CCW" around the second axial line "L2". Accordingly, a structure of a control circuit for the motor 50 and the like can be simplified. Further, an inexpensive motor which is rotated only one direction can be used as the motor 50.

Further, when the driven wheel 7 is turned to the other side "L2CCW" around the second axial line "L2", an urging force of the urging member 8 is utilized. However, in this case, the driven wheel 7 slides on the cam face forming part 670 of the drive wheel 6. Therefore, turning speed and the like of the driven wheel 7 when turned to the other side "L2CCW" around the second axial line "L2" can be controlled.

In addition, a plurality of drive teeth 66 and a plurality of driven teeth 76 are respectively provided at positions different from each other in an axial line direction and thus the drive teeth 66 and the driven teeth 76 can be meshed with each other in a predetermined combination. Therefore, an angular position of the driven wheel 7 can be controlled appropriately. In addition, the drive teeth 66 are provided at respective positions one by one in the first axial line "L1" direction and the driven teeth 76 are provided at respective positions one by one in the second axial line "L2" direction. Therefore, the drive teeth 66 and the driven teeth 76 can be meshed with each other in a predetermined combination and thus an angular position of the driven wheel can be controlled further appropriately.

Further, the cam face forming part 670 is provided with a plurality of cam faces 67 at different positions in the first axial line "L1" direction on which a plurality of the driven teeth 76 slides sequentially when the driven wheel 7 is turned to the other side "L2CCW" around the second axial line "L2" by the urging force of the urging member 8. Therefore, when the driven wheel 7 is to be turned to the other side "L2CCW" around the second axial line "L2" by the urging force of the urging member 8, a plurality of the driven teeth 76 sequentially slides on a plurality of the cam face 67. Accordingly, when the driven wheel 7 is to be turned to the other side "L2CCW" around the second axial line "L2" by the urging force of the urging member 8, turning speed and the like of the driven wheel 7 can be controlled over a wide angular range.

Further, outer diameters of a plurality of the cam faces 67 are reduced from one side "L1CCW" around the first axial line "L1" toward the other side "L1CW" and thus the plurality of the driven teeth 76 is capable of smoothly and sequentially sliding on the plurality of the cam faces 67.

Further, the drive teeth 66 are provided in the drive teeth forming part 660 at respective positions one by one in the first axial line "L1" direction and the driven teeth 76 are provided in the driven teeth forming part 760 at respective positions one by one in the second axial line "L2" direction. Therefore, even when a foreign matter is caught between the drive tooth 66 and the driven tooth 76, the foreign matter is easily released.

Further, during respective regions where a plurality of the driven teeth 76 sequentially slides on a plurality of the cam faces 67, while the driven tooth 76 in a current region is contacted with the cam face 67, the driven tooth 76 in the subsequent region begins to contact with the cam face 67 and thus the plurality of the driven teeth 76 is capable of sliding on the plurality of the cam faces 67 sequentially and smoothly. Therefore, when a combination of the driven tooth 76 and the cam face 67 sliding each other is transferred, the driven wheel 7 is restrained from being rapidly turned.

Further, in the plurality of the drive teeth 66, a drive tooth 66 located on one side "L1a" in the first axial line "L1" direction is located on the other side "L1CW" around the first axial line "L1" with respect to a drive tooth 66 located on the other side "L1b" in the first axial line "L1" direction. Further, in the plurality of the driven teeth 76, a driven tooth 76 located on one side "L2a" in the second axial line "L2" direction is located on the other side "L2CCW" around the second axial line "L2" with respect to a driven tooth 76 located on the other side "L2b" in the second axial line "L2" direction. Further, in the plurality of the cam faces 67, a cam face 67 located on one side "L1a" in the first axial line "L1" direction is located on one side "L1CCW" around the first axial line "L1" with respect to a cam face 67 located on the other side "L1b" in the first axial line "L1" direction. Therefore, the plurality of the drive teeth 66, the plurality of the driven teeth 76, and the plurality of the cam faces 67 can be formed in stepped shapes and thus the drive wheel 6 and the driven wheel 7 are easily manufactured. Further, even when a positional relationship between the drive wheel 6 and the driven wheel 7 is displaced in the axial line direction, each of the drive teeth 66 is restrained from being abutted with an unexpected driven tooth 76.

Further, the driven teeth forming part 760 is provided with the final driven tooth 765 with which the drive tooth 66 is not abutted on one side "L2CW" around the second axial line "L2" with respect to the plurality of the driven teeth 76 and on the other side "L2b" in the second axial line "L2" direction with respect to the plurality of the driven teeth 76. Further, the cam face forming part 670 is provided with the final cam face 675 with which the final driven tooth 765 is abutted. In addition, the respective pitches of the plurality of the driven teeth 76 are equal to each other. However, the pitch between the driven tooth 76 located on the most one side "L2CW" around the second axial line "L2" and the final driven tooth 765 is wider than the pitch of the plurality of the driven teeth 76. Therefore, the state that the driven teeth 76 slide on the cam face 67 can be smoothly transferred to the state that the final driven tooth 765 slides on the final cam face 675 and thus the driven wheel 7 is restrained from being rapidly turned.

Further, the position sensor 9 is structured so that, after the driven wheel 7 is turned to the most one side "L2CW" around the second axial line "L2", an output from the switch 92 is switched at a midway position of a stop region (region "b" shown in FIG. 12) and, after the driven wheel 7 is turned to the most other side "L2CCW" around the second axial line "L2", an output from the switch 92 is switched at a midway position of a stop region (region "a" shown in FIG. 12). Therefore, even when a positional relationship between the drive wheel 6 and the turnable lever 91 is displaced to some extent, the stopped state of the driven wheel 7 can be surely monitored through the output from the switch 92.

First Modified Embodiment

Figure 13:
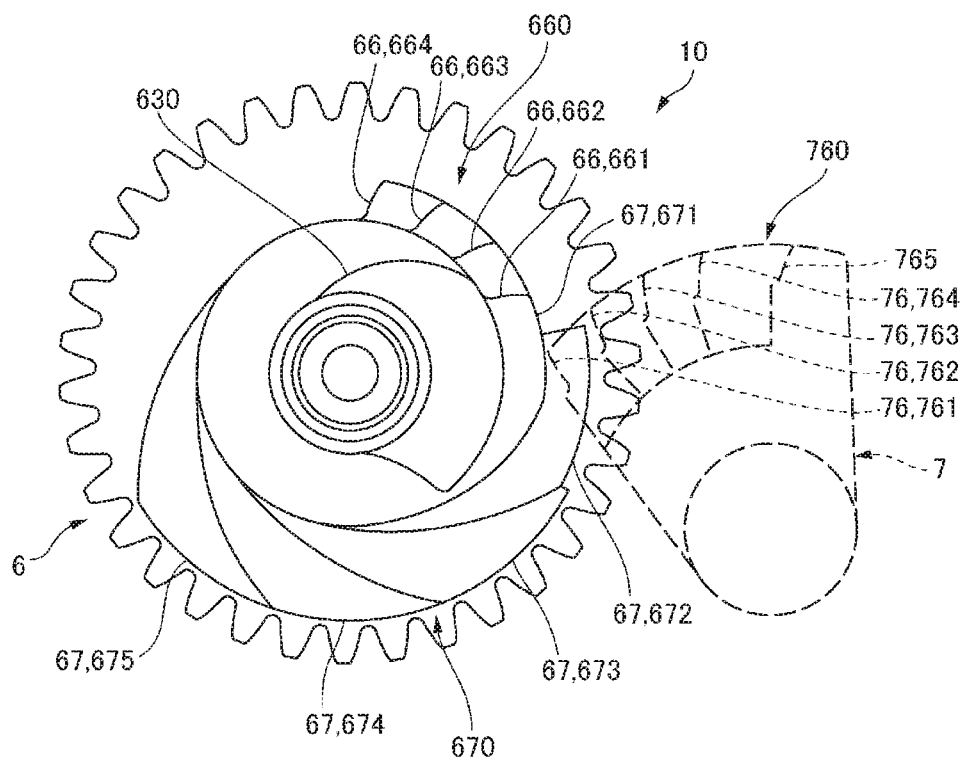
FIG. 13 is an explanatory view showing a drive wheel and a driven wheel in accordance with a first modified embodiment of the present invention.

FIG. 13 is an explanatory view showing a drive wheel 6 and a driven wheel 7 in accordance with a first modified embodiment of the present invention. In the embodiment described above, as described with reference to FIG. 9, an end part of each of the plurality of the cam faces 67 on one side "L1CCW" around the first axial line "L1" is located on an outer side in a radial direction with respect to a cam face 67 which is adjacent to the other side "L1CW" around the first axial line "L1". However, as shown in FIG. 13, it may be structured that a plurality of cam faces 67 includes a cam face whose end part on one side "L1CCW" around the first axial line "L1" is overlapped with an outer side edge of a cam face 67 adjacent on the other side "L1CW" around the first axial line "L1". More specifically, in the drive wheel 6 shown in FIG. 13, an end part of the fourth cam face 674 on one side "L1CCW" around the first axial line "L1" is overlapped with an outer side edge of the third cam face 673 adjacent to one side "L1CCW" around the first axial line "L1". Further, an end part of the final cam face 675 on one side "L1CCW" around the first axial line "L1" is overlapped with an outer side edge of the fourth cam face 674 which is adjacent on one side "L1CCW" around the first axial line "L1". According to this structure, the cam face forming part 670 is easily formed.

Second Modified Embodiment

In the embodiment shown in FIGS. 5 through 9 (hereinafter, referred to as the above-mentioned embodiment), the fourth drive tooth 664 (final drive tooth) of the drive wheel 6 which is formed on the most other side "L1b" in the first axial line "L1" direction is formed so that the tooth face which faces one side "L1CCW" around the first axial line "L1" is connected with the outer peripheral face of the drive teeth forming part 660 in an "R"-shape (see FIGS. 6 and 9). Therefore, even when pitches of the plurality of the drive teeth 66 are going to be measured, it is difficult to accurately measure an angular position of a tooth tip of the fourth drive tooth 664 and thus it is difficult to measure an accurate pitch. Similarly, the first driven tooth 761 formed on the most one side "L1a" in the first axial line "L1" direction is formed so that the tooth face which faces the other side "L2CCW" around the second axial line "L2" is connected with the outer peripheral face of the driven teeth forming part 760 in an "R"-shape (see FIGS. 5 and 9). Therefore, even when shapes of tooth parts of the plurality of driven teeth 76 are going to be measured, it is difficult to accurately measure an angular position of a tooth tip of the first driven tooth 761 and thus it is difficult to measure an accurate shape of the tooth part. Therefore, it is difficult to measure accurate positions of tooth tips of the driven teeth 76 and thus it is difficult to measure accurate pitches of the driven teeth 76.

In a second modified embodiment, the drive wheel 6 is formed with a first step part 68 (see FIGS. 15 and 17) for accurately measuring a shape of a tooth part of the fourth drive tooth 664. Further, the driven wheel 7 is formed with a second step part 78 (see FIGS. 14 and 16) for accurately measuring a shape of a tooth part of the first driven tooth 761.

(First Step Part)

Figure 14:
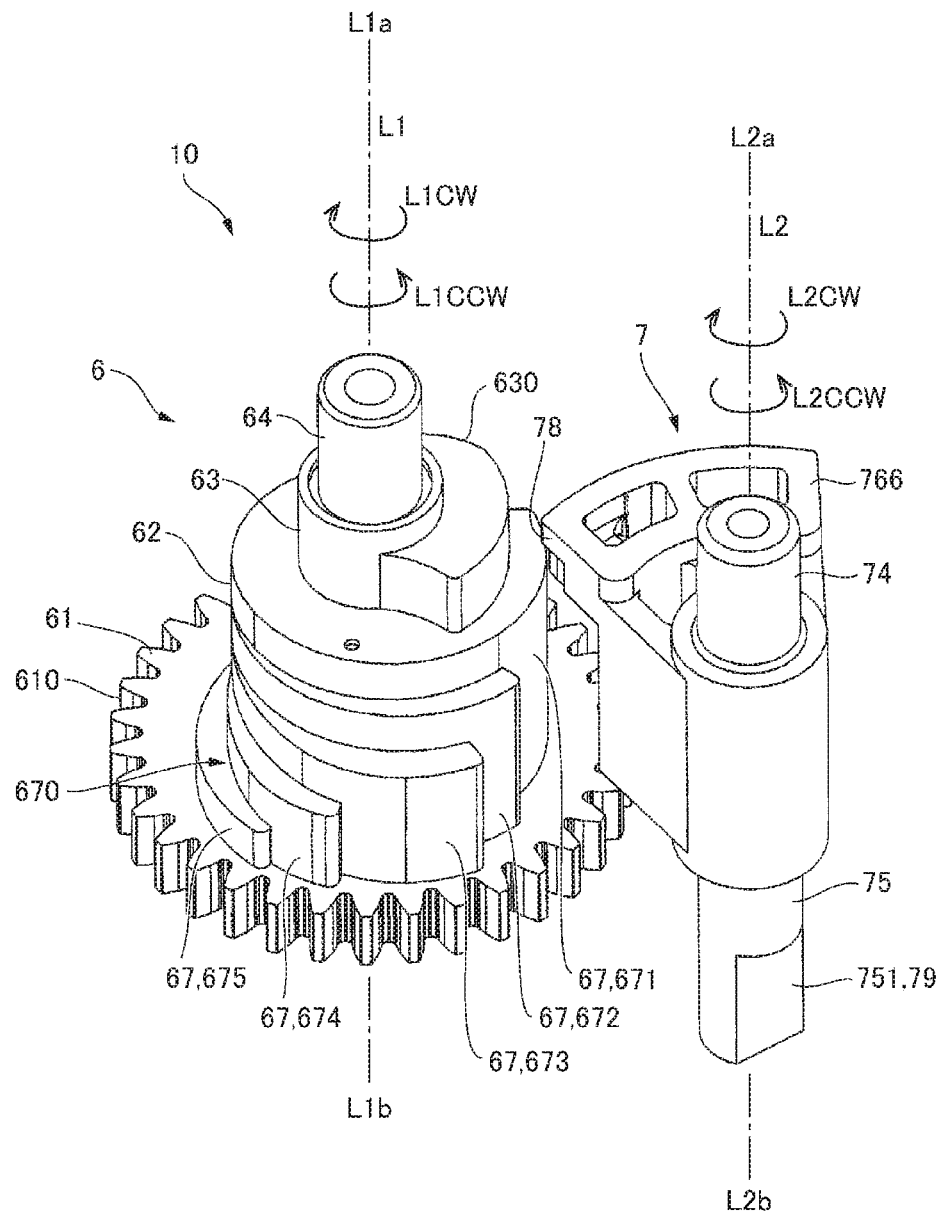
FIG. 14 is a perspective view showing a drive wheel and a driven wheel in accordance with a second modified embodiment of the present invention which are viewed from the other side.
Figure 15:
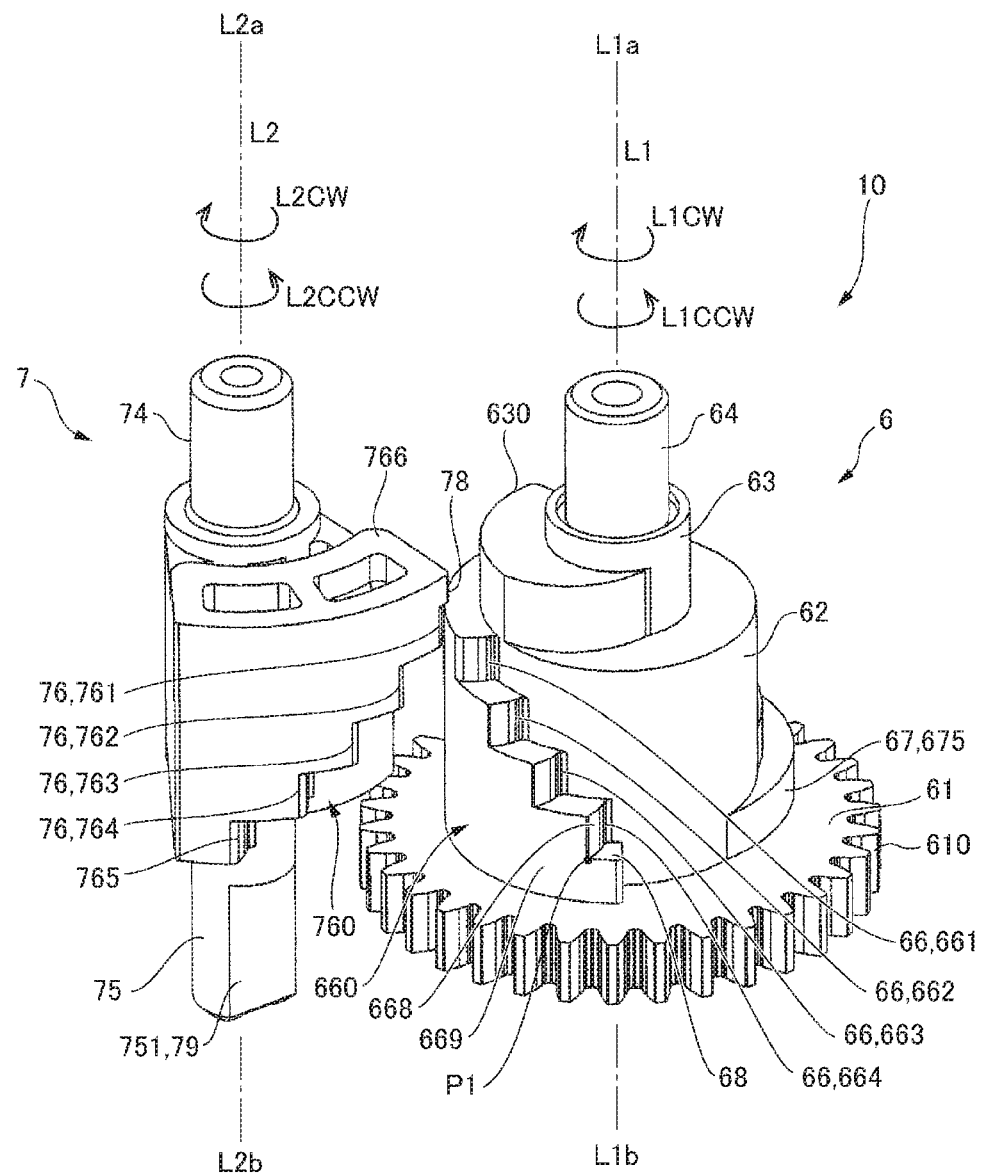
FIG. 15 is a perspective view showing the drive wheel and the driven wheel in the second modified embodiment which are viewed from one side.
Figure 16:
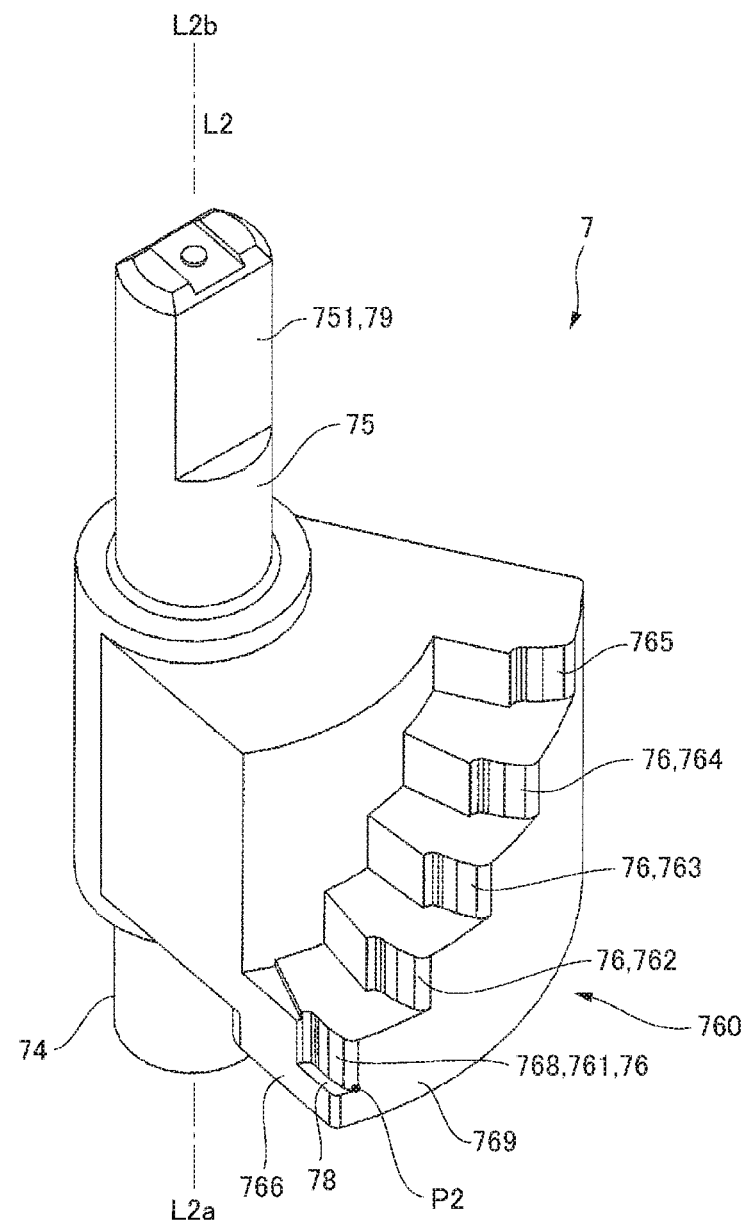
FIG. 16 is a perspective view showing the driven wheel in the second modified embodiment which is viewed from a side of a driven teeth forming part.
Figure 17:
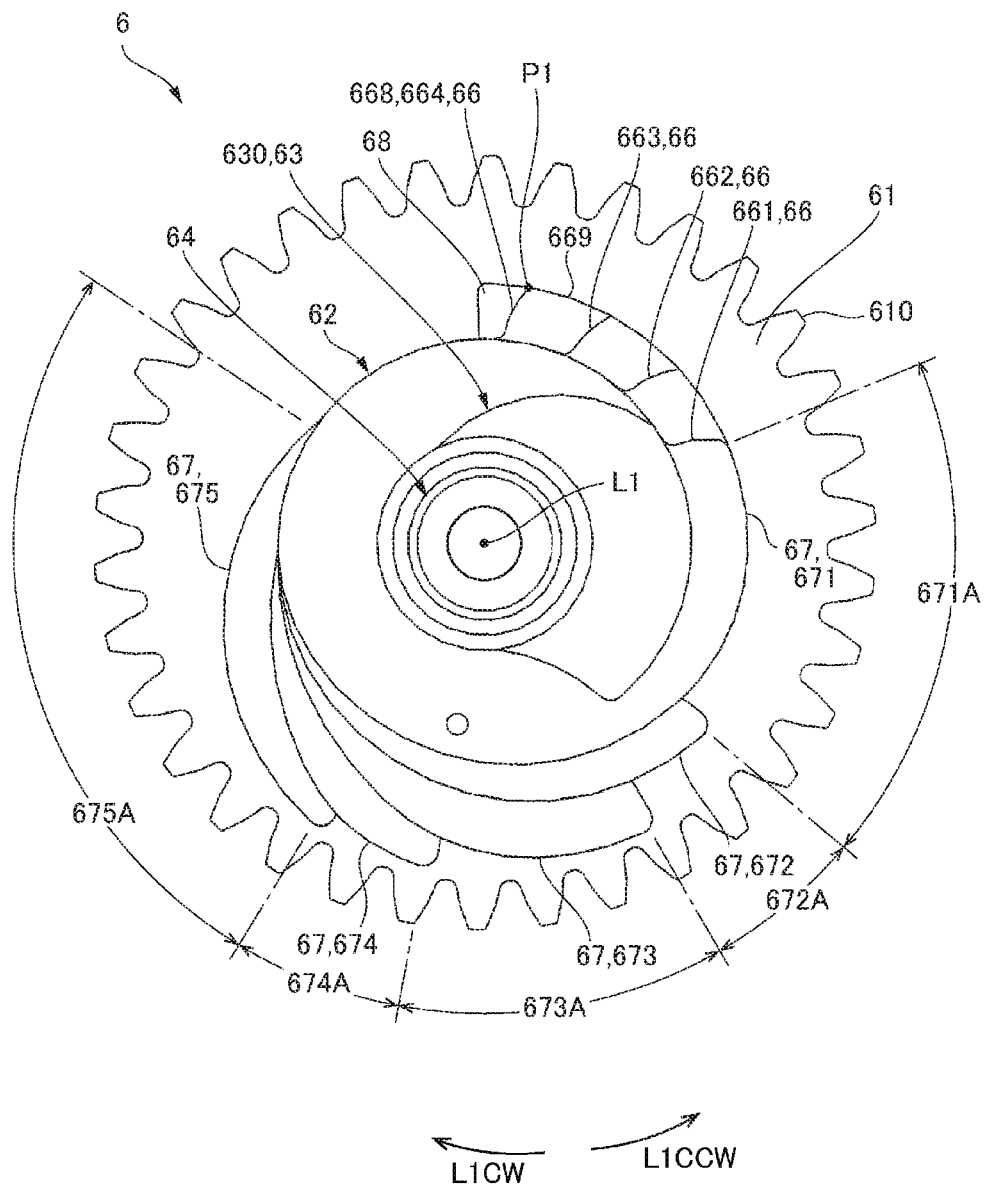
FIG. 17 is a plan view showing the drive wheel in the second modified embodiment.

FIG. 14 is a perspective view showing a drive wheel 6 and a driven wheel 7 in a second modified embodiment which are viewed from one side. FIG. 15 is a perspective view showing the drive wheel 6 and the driven wheel 7 in the second modified embodiment which are viewed from the other side. FIG. 16 is a perspective view showing the driven wheel 7 in the second modified embodiment which is viewed from a side of a driven teeth forming part 760. FIG. 17 is a plan view showing the drive wheel 6 in the second modified embodiment. As shown in FIG. 15, the drive wheel 6 in the second modified embodiment is formed with a drive teeth forming part 660 over a part in a circumferential direction of the first body part 62, and the drive teeth forming part 660 is formed with four drive teeth 66 and a first step part 68 structured to measure a drive tooth pitch in a multi-stage shape along the first axial line "L1" direction. The four drive teeth 66 (first drive tooth 661, second drive tooth 662, third drive tooth 663 and fourth drive tooth 664) and the first step part 68 are disposed in this order around the first axial line "L1".

The first step part 68 for measuring a drive tooth pitch is formed at a position adjacent in the circumferential direction to a tooth face 668 of the fourth drive tooth 664 which is a final drive tooth located on the most other side "L1b" around the first axial line "L1". The first step part 68 is protruded to one side "L1CCW" around the first axial line "L1" from a midway position in the first axial line "L1" direction of the tooth face 668 of the fourth drive tooth 664. A portion on the other side "L1CW" around the first axial line "L1" from end parts (tooth tips) on an outer side in a radial direction of tooth faces of four drive teeth 66 is a circular peripheral face 669 which is continuously extended in the circumferential direction. The circular peripheral face 669 is extended to the other side "L1b" in the first axial line "L1" direction of the fourth drive tooth 664 and is continuously extended to an end part on an outer side in the radial direction of a face on one side "L1CCW" around the first axial line "L1" of the first step part 68. In other words, in the drive wheel 6 in the second modified embodiment, the outer sides in the radial direction of four drive teeth 66 and the first step part 68 are continuously formed to be the circular peripheral face 669 with the first axial line "L1" as a center. The circular peripheral face 669 is an outer peripheral face of the drive teeth forming part 660 and intersects the tooth faces of four drive teeth 66.

The drive wheel 6 in the second modified embodiment is formed with the first step part 68 which is a step part for measuring a drive tooth pitch at a position adjacent to the fourth drive tooth 664 in the circumferential direction and thus the drive teeth forming part 660 is formed with the circular peripheral face 669 in a range extending across the tooth face 668 of the fourth drive tooth 664 in the circumferential direction. When the circular peripheral face 669 is formed in such a range, an angular position of the end part (tooth tip) on the outer side in the radial direction of the tooth face 668 of the fourth drive tooth 664 can be clearly measured as a position of the intersecting point "P1" (see FIGS. 15 and 17) where the circular peripheral face 669 and the tooth face 668 intersect each other similarly to the tooth tips of other three drive teeth 66. Therefore, in the second modified embodiment, the positions of the tooth tips of all drive teeth 66 can be measured with a high degree of accuracy. Accordingly, pitches of the drive teeth 66 can be measured with a high degree of accuracy. In accordance with an embodiment of the present invention, the outer peripheral face of the first step part 68 is not required to be a circular peripheral face with the first axial line "L1" as a center. It may be structured that the outer peripheral face of the first step part 68 is formed to be a face intersecting the end part (tooth tip) on the outer side in the radial direction of the tooth face 668 of the fourth drive tooth 664 (final drive tooth). For example, the outer peripheral face of the first step part 68 may be a face extending in a tangential direction with respect to the circular peripheral face 669.

Further, the first step part 68 is a protruded part protruding from the circular plate part 61 to one side "L1a" in the first axial line "L1" direction. However, it may be structured that the circular plate part 61 is recessed to the other side "L1b" in the first axial line "L1" direction to form a first recessed part which is a step part for measuring a drive tooth pitch. In this case, when an inner peripheral face on an outer side in a radial direction of the recessed part is formed to be a circular peripheral face having the same diameter as the circular peripheral face 669, the inner peripheral face of the first recessed part is formed to be a face intersecting the tooth face 668 of the fourth drive tooth 664. Therefore, an angular position of a tooth tip of the fourth drive tooth 664 can be measured with a high degree of accuracy based on a position of an intersecting point of the inner peripheral face of the first recessed part and the tooth face 668. Accordingly, pitches of the drive teeth 66 can be measured with a high degree of accuracy. Also in this case, the inner peripheral face of the first recessed part may be a face intersecting the end part (tooth tip) on the outer side in the radial direction of the tooth face 668 and is not required to be a circular peripheral face with the first axial line "L1" as a center.

(Second Step Part)

As shown in FIGS. 15 and 16, the driven wheel 7 in the second modified embodiment is formed with a driven teeth forming part 760. The driven teeth forming part 760 is formed with a second step part 78 which is a step part for measuring a driven tooth pitch in addition to a plurality of the driven teeth 76 and the final driven tooth 765. The driven teeth forming part 760 is formed with the final driven tooth 765, four driven teeth 76 and the second step part 78 in a multi-stage shape along the second axial line "L2" direction. The four driven teeth 76 (first driven tooth 761, second driven tooth 762, third driven tooth 763, and fourth driven tooth 764) and the final driven tooth 765 and the second step part 78 are disposed in this order around the second axial line "L2". The driven wheel 7 is formed with an extended part 766 where a portion on an outer side in the radial direction of the driven teeth forming part 760 is extended to one side in the second axial line "L2" direction with respect to the first driven tooth 761. The second step part 78 is provided at an end part on the other side "L2CCW" around the second axial line "L2" of the extended part 766.

The second step part 78 for measuring a driven tooth pitch is formed at a position adjacent in the circumferential direction to the tooth face 768 of the first driven tooth 761 which is located on the most other side "L2CCW" around the second axial line "L2". The second step part 78 is protruded to the other side "L2CCW" around the second axial line "L2" with respect to the tooth face 768 of the first driven tooth 761. A portion on one side "L2CW" around the second axial line "L2" from end parts (tooth tips) on the outer side in the radial direction of the tooth faces of four driven teeth 76 is a circular peripheral face 769 which is continuously extended in the circumferential direction. The circular peripheral face 769 is extended to the extended part 766 provided on one side "L2a" in the second axial line "L2" direction of the first driven tooth 761 and is continuously extended to the second step part 78. In other words, in the driven wheel 7 in the second modified embodiment, outer sides in the radial direction of four driven teeth 76, the final driven tooth 765 and the second step part 78 are continuously formed to be a circular peripheral face 769 with the second axial line "L2" as a center. The circular peripheral face 769 is an outer peripheral face of the driven teeth forming part 760 and intersects the tooth faces of four driven teeth 76 and the final driven tooth 765.

The driven wheel 7 in the second modified embodiment is formed with the second step part 78 at a position adjacent to the first driven tooth 761 in the circumferential direction and thus the driven teeth forming part 760 is formed with the circular peripheral face 769 in a range extending across the tooth face 768 of the first driven tooth 761 in the circumferential direction. When the circular peripheral face 769 is formed in such a range, an angular position of the end part (tooth tip) on the outer side in the radial direction of the tooth face 768 of the first driven tooth 761 can be clearly measured as a position of the intersecting point "P2" (see FIG. 16) where the circular peripheral face 769 and the tooth face 768 intersect each other similarly to the tooth tips of other three driven teeth 76 and the final driven tooth 765. Therefore, in the second modified embodiment, the positions of the tooth tips of all driven teeth 76 can be measured with a high degree of accuracy. Accordingly, pitches of the driven teeth 76 can be measured with a high degree of accuracy. In accordance with an embodiment of the present invention, the outer peripheral face of the second step part 78 is not required to be a circular peripheral face with the second axial line "L2" as a center. It may be structured that the outer peripheral face of the second step part 78 is formed to be a face intersecting the end part (tooth tip) on the outer side in the radial direction of the tooth face 768 of the first driven tooth 761. For example, the outer peripheral face of the second step part 78 may be a face extending in a tangential direction with respect to the circular peripheral face 769.

Alternatively, it may be structured that an outer diameter of the extended part 766 is set to be larger than a diameter of the circular peripheral face 769 and the extended part 766 is recessed to one side "L2a" in the second axial line "L2" direction to form a second recessed part as a step part for measuring a driven tooth pitch. In this case, when an inner peripheral face on an outer side in a radial direction of the second recessed part is formed to be a circular peripheral face having the same diameter as the circular peripheral face 769, an angular position of the tooth tip of the first driven tooth 761 can be measured with a high degree of accuracy based on a position of an intersecting point of the inner peripheral face of the second recessed part and the tooth face 768. Therefore, pitches of the driven teeth 76 can be measured with a high degree of accuracy. Also in this case, the inner peripheral face of the second recessed part may be formed to be a face intersecting the tooth face 768 and is not required to be a circular peripheral face with the second axial line "L2" as a center.

(Shape of Cam Face)

As shown in FIG. 17, the drive wheel 6 in the second modified embodiment is provided with five cam faces 67 similarly to the embodiment (the above-mentioned embodiment) shown in FIGS. 5 through 9. In the five cam faces 67, four cam faces (second cam face 672, third cam face 673, fourth cam face 674 and final cam face 675) except the first cam face 671 are located on the other side "L1CW" around the first axial line "L1" with respect to their positions in the above-mentioned embodiment. Further, the second cam face 672 is provided at a position whose diameter is reduced to an inner side in the radial direction with respect to the case in the above-mentioned embodiment.

In the second modified embodiment, each of five cam faces 67 is provided with a cam region 67A which is not overlapped with a cam face 67 adjacent on the other side "L1CW" around the first axial line "L1" in the circumferential direction. A cam region 671A of the first cam face 671 located on the most one side "L1CCW" around the first axial line "L1" is wider in the circumferential direction than cam regions 672A, 673A and 674A of other cam faces (second cam face 672, third cam face 673 and fourth cam face 674) except the final cam face 675 located on the most other side "L1CW" around the first axial line "L1". Especially, the cam region 672A of the second cam face 672 is the narrowest in the circumferential direction. Further, the cam region 675A of the final cam face 675 is narrower in the circumferential direction than that in the above-mentioned embodiment. Further, an end part on one side "L1CCW" around the first axial line "L1" of the second cam face 672 is shifted to a position whose diameter is reduced to an inner side in the radial direction with respect to end parts on one side "L1CCW" of the cam faces (third cam face 673, fourth cam face 674 and final cam face 675) located on the other side "L1CW" around the first axial line "L1" with respect to the second cam face 672.

Figure 18:
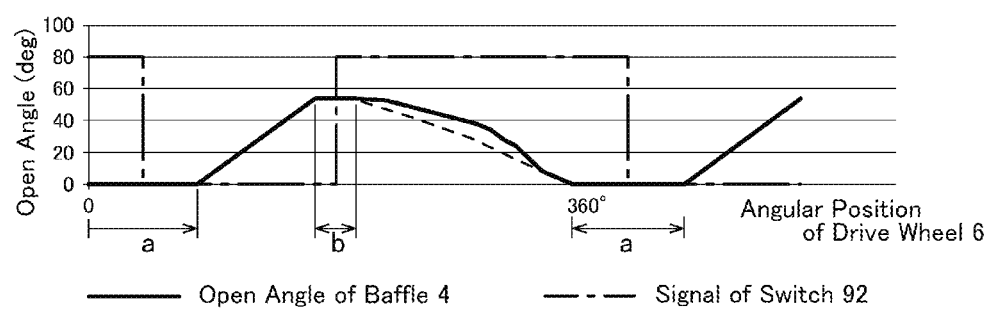
FIG. 18 is an explanatory view showing a relationship between an angular position of the drive wheel and an open angle of a baffle in the second modified embodiment.

FIG. 18 is an explanatory view showing a relationship between an angular position of the drive wheel 6 and an open angle of a baffle 4 in the second modified embodiment. In FIG. 18, the broken line shows an open angle of the baffle 4 in the embodiment (the above-mentioned embodiment) shown in FIGS. 5 through 9, and is the same as the graph in FIG. 12. Further, the solid line shows an open angle of the baffle 4 in the second modified embodiment. In the second modified embodiment, the cam region 671A of the first cam face 671 is set to be longer than that in the above-mentioned embodiment and thus, in a state that the first driven tooth 761 is slid on the first cam face 671, a turning angle period of the drive wheel 6 becomes longer than that in the above-mentioned embodiment during the drive wheel 6 is turned. As a result, in a region where the baffle 4 begins to close, a turning angle of the driven wheel 7 is small with respect to a turning angle of the drive wheel 6. Therefore, as shown in FIG. 18, in a region where the baffle 4 begins to close, an inclination of a graph (solid line) indicating a relationship between an angular position of the drive wheel 6 and an open angle of the baffle 4 is gradual in comparison with the inclination of the broken line (solid line in FIG. 12). In other words, in a region where the baffle 4 begins to close, a turning speed of the baffle 4 is slower than that of the above-mentioned embodiment and thus the baffle 4 begins to close slowly in comparison with the case of the above-mentioned embodiment.

Further, an end part on one side "L1CCW" around the first axial line "L1" of the second cam face 672 is shifted to a position whose diameter is reduced in comparison with the case of the above-mentioned embodiment. Therefore, a timing when the second driven tooth 762 begins to contact with the second cam face 672 is delayed in comparison with the case of the above-mentioned embodiment and a timing when the first driven tooth 761 is separated from the first cam face 671 is delayed in comparison with the above-mentioned embodiment. Therefore, a turning angle of the drive wheel 6 in a state that the first driven tooth 761 slides on the first cam face 671 (damper angle corresponding to the first cam face 671) becomes further longer and thus a turning speed of the baffle 4 in a region where the baffle 4 begins to close is further reduced.

In the drive wheel 6 in the second modified embodiment, a turning position of the drive wheel 6 when the final driven tooth 765 is separated from the final cam face 675 is substantially the same position as the above-mentioned embodiment. In other words, although the timing when the second driven tooth 762 is contacted with the second cam face 672 is delayed in comparison with the above-mentioned embodiment, the timing when the final driven tooth 765 is separated from the final cam face 675 is substantially the same as the above-mentioned embodiment. Therefore, when the region where the baffle begins to close has passed, after that, a turning angle of the driven wheel 7 with respect to a turning angle of the drive wheel 6 becomes larger in comparison with the case of the above-mentioned embodiment. In other words, when the region where the baffle begins to close has passed, a turning speed of the baffle 4 becomes faster than the case of the above-mentioned embodiment and, as a result, the baffle 4 is finished to be closed at the same timing as the case of the above-mentioned embodiment.

As described above, in the second modified embodiment, it is structured so that a turning speed of the baffle 4 is slow in a region where the baffle 4 begins to close and, when the region where the baffle 4 begins to close has passed, after that, the turning speed of the baffle 4 is fast. Specifically, a turning speed of the driven wheel 7 during the first driven tooth 761 slides on the first cam face 671 is larger than the case of the above-mentioned embodiment. Further, turning speeds of the driven wheel 7 while the corresponding driven teeth 76 respectively slide on the second cam face 672, the third cam face 673 and the fourth cam face 674 are respectively smaller than the turning speed of the driven wheel 7 during the first driven tooth 761 slides on the first cam face 671. In this embodiment, a turning speed of the driven wheel 7 (in other words, a closing speed of the baffle 4) with respect to a turning angle of the drive wheel 6 is varied by a shape and a pitch of the driven teeth 76 in addition to a shape of the cam face 67. Therefore, an embodiment which realizes a change of a turning speed as described above is not limited to the second modified embodiment. For example, in a case that pitches of the driven teeth 76 are changed, the shapes of the cam faces 67 may be appropriately changed so as to correspond to the pitches.

(Assembling Marks of Drive Wheel and Driven Wheel)

FIG. 19 is a perspective view showing a baffle drive mechanism 5 including the drive wheel 6 and the driven wheel 7 and a cover 3 in the second modified embodiment. As shown in FIGS. 14 and 15, a shaft part 64 is formed at a tip end on one side "L1a" in the first axial line "L1" direction of the drive wheel 6, and a shaft part 74 is formed at a tip end on one side "L2a" in the second axial line "L2" direction of the driven wheel 7. The cover 3 is provided with a bottom part 31 facing the partition 22 of the frame 2 in the "X" direction, and a side wall part 32 standing up to the side of the partition 22 ("X2" direction) from an outer peripheral edge of the bottom part 31. The bottom part 31 is formed with two turning support parts 33 and 34 which turnably support the shaft parts 64 and 74.

As shown in FIG. 19, the drive wheel 6 is assembled into the cover 3 in a posture that the circular plate part 61 provided at an end part on the other side "L1b" in the first axial line "L1" direction is disposed on an upper side. The drive wheel 6 is provided with a shaft part 65 protruded to the other side "L1b" from the center of the circular plate part 61. The shaft part 65 is turnably supported by a turning support part provided in the partition 22 (not shown). The drive wheel 6 is provided with a first assembling mark 69 for positioning its turning position around the first axial line "L1" at an assembling reference position 6A. In the second modified embodiment, a recessed part formed in an outer peripheral part of a face on the other side "L1b" of the circular plate part 61 is used as the first assembling mark 69. The first assembling mark 69 is formed at one position in a circumferential direction. The assembling reference position 6A of the drive wheel 6 is, as shown in FIG. 19, a position where the position of the first assembling mark 69 with respect to the first axial line "L1" is set on one side "Z1" in the "Z" direction. The motor 50 is disposed on one side "Z1" in the "Z" direction with respect to the drive wheel 6. In other words, the assembling reference position 6A is a turning position to which the first assembling mark 69 is directed to the side where the motor 50 is located.

The driven wheel 7 is assembled into the cover 3 in a posture that a shaft part 75 provided at an end part on the other side "L2b" in the second axial line "L2" direction is located on an upper side. As described above, the baffle 4 is fixed to a tip end of the shaft part 75. A tip end of the shaft part 75 is formed with a second assembling mark 79 for positioning a turning position around the second axial line "L2" of the driven wheel 7 to an assembling reference position 7A. In the second modified embodiment, a tip end of the shaft part 75 is formed in an "I"-cut shape in which flat faces 751 are formed at two positions in a radial direction so as to face each other. The flat face 751 is used as the second assembling mark 79. In this embodiment, the "I"-cut shape of the tip end of the shaft part 75 is used as a turning prevention shape for transmitting turning of the driven wheel 7 to the baffle 4. The assembling reference position 7A of the driven wheel 7 is, as shown in FIG. 19, a position where the direction of the flat face 751 (second assembling mark 79) is coincided with the "Z" direction. In this embodiment, two turning positions where the direction of the flat face 751 is coincided with the "Z" direction are existed. However, at the assembling reference position 7A, the driven teeth forming part 760 is located on the side of the drive wheel 6. The motor 50 is disposed on one side "Z1" in the "Z" direction with respect to the driven wheel 7. In other words, the assembling reference position 7A is a turning position where the motor 50 is located in a direction along the flat face 751.

Effects of Second Modified Embodiment

As described above, in the rotation transmission mechanism 10 and the damper device 1 which are provided with the drive wheel 6 and the driven wheel 7 in the second modified embodiment, an intersecting point of the tooth face 668 of the fourth drive tooth 664 which is the final drive tooth and the outer peripheral face of the first step part 68 can be measured. Therefore, a shape of the tooth part of the fourth drive tooth 664 can be measured accurately and a position of the tooth tip of the fourth drive tooth 664 can be accurately measured and thus the pitches of the drive teeth 66 can be measured accurately. Further, an intersecting point of the tooth face 768 of the first driven tooth 761 and the outer peripheral face of the second step part 78 can be measured. Therefore, a shape of the tooth part of the first driven tooth 761 can be measured accurately and a position of the tooth tip of the first driven tooth 761 can be accurately measured and thus the pitches of the driven teeth 76 can be measured accurately. Further, the extended part 766 which is formed by extending the driven teeth forming part 760 in the second axial line "L2" direction is formed and thus a height can be secured in which the second step part 78 is capable of being formed in the driven teeth forming part 760.

Further, in the drive wheel 6 and the driven wheel 7 in the second modified embodiment, when a plurality of the driven teeth 76 is sequentially slid on a plurality of the cam faces 67, a region where the first driven tooth 761 slides on the first cam region 671A is set to be long. Further, a turning speed of the driven wheel 7 during the first driven tooth 761 is slid on the first cam face 671 is set to be smaller (slower) than a turning speed of the driven wheel 7 during the driven teeth 76 are correspondingly slid on the second cam face 672, the third cam face 673, and the fourth cam face 674. Further, an end part on one side "L1CCW" around the first axial line "L1" of the second cam face 672 is located on the inner side in the radial direction with respect to the end parts on one side "L1CCW" of the third cam face 673, the fourth cam face 674 and the final cam face 675. According to this structure, when the driven wheel 7 is to be turned, the driven wheel 7 can be turned slowly in the beginning.

In addition, the drive wheel 6 in the second modified embodiment is provided with the first assembling mark 69 for positioning a turning position around the first axial line "L1" to the assembling reference position 6A, and the driven wheel 7 in the second modified embodiment is provided with the second assembling mark 79 for positioning a turning position around the second axial line "L2" to the assembling reference position 7A. Therefore, turning positions of the drive wheel 6 and the driven wheel 7 can be easily positioned to the predetermined assembling reference positions 6A and 7A. Accordingly, workability in assembling is satisfactory. In accordance with an embodiment of the present invention, the first assembling mark 69 and the second assembling mark 79 are not limited to the embodiment as shown in FIG. 19. The first assembling mark 69 and the second assembling mark 79 may be structured so that turning positions of the drive wheel 6 and the driven wheel 7 can be positioned in a state that they are turnably attached to the cover 3.

Other Embodiments

Although the present invention has been shown and described with reference to a specific embodiment, various changes and modifications will be apparent to those skilled in the art from the teachings herein. For example, in the embodiment described above, the drive teeth 66 are provided one by one at respective positions in the first axial line "L1" direction, and the driven teeth 76 are provided one by one at respective positions in the second axial line "L2" direction. However, it may be structured that the drive teeth 66 and the driven teeth 76 are provided in plurality at respective positions in an axial line direction. Further, the damper device 1 in the embodiment described above is used in a refrigerator. However, the damper device is not limited to a device used in a refrigerator. Further, in the embodiment described above, the present invention is applied to the rotation transmission mechanism 10 used in the damper device 1. However, the present invention may be applied to a rotation transmission mechanism used in other devices.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rotation transmission mechanism comprising:
a drive wheel structured to rotate to one side around a first axial line;
a driven wheel which is driven and turned by the drive wheel to one side around a second axial line parallel to the first axial line; and
an urging member structured to urge the driven wheel to the other side around the second axial line;
wherein the drive wheel comprises:
a drive teeth forming part in which a plurality of drive teeth structured to drive and turn the driven wheel to the one side around the second axial line is disposed in a circumferential direction; and
a cam face forming part on which the driven wheel is slid when the driven wheel is turned to the other side around the second axial line by an urging force of the urging member;
wherein the drive teeth forming part and the cam face forming part are provided so as to be adjacent to each other in the circumferential direction;
wherein the driven wheel comprises a driven teeth forming part in which a plurality of driven teeth is disposed over an angular range so that, when the drive wheel is turned to the one side around the first axial line, the drive teeth are sequentially abutted with the driven teeth;
wherein the plurality of the drive teeth is provided at positions different from each other in a first axial line direction along the first axial line;
wherein the plurality of the driven teeth is provided at positions different from each other in a second axial line direction along the second axial line; and
wherein the cam face forming part comprises a plurality of cam faces at positions different from each other in the first axial line direction on which the plurality of the driven teeth are sequentially slid when the driven wheel is turned to the other side around the second axial line by the urging force of the urging member.

2. The rotation transmission mechanism according to claim 1, wherein an outer diameter of each of the plurality of the cam faces is reduced from the one side around the first axial line to the other side.

3. The rotation transmission mechanism according to claim 2, wherein
the drive teeth forming part comprises the drive teeth one by one at the positions in the first axial line direction, and
the driven teeth forming part comprises the driven teeth one by one at the positions in the second axial line direction.

4. The rotation transmission mechanism according to claim 3, wherein in each of regions where the plurality of the driven teeth are sequentially slid on the plurality of the cam faces, a subsequent driven tooth for a next region begins to contact with a subsequent corresponding cam face while the driven tooth in a current region is contacted with its corresponding cam face.

5. The rotation transmission mechanism according to claim 4, wherein
in the plurality of the drive teeth, the drive tooth located on the most one side in the first axial line direction is located on the most other side around the first axial line,
in the plurality of the driven teeth, the driven tooth located on the most one side in the second axial line direction is located on the most other side around the second axial line, and
in the plurality of the cam faces, the cam face located on the most one side in the first axial line direction is located on the most one side around the first axial line.

6. The rotation transmission mechanism according to claim 5, wherein
each of the plurality of the drive teeth is formed so that a face on the one side around the first axial line is formed to be a tooth face,
the drive wheel comprises a first step part which is formed at a position adjacent in the circumferential direction to the tooth face of a final drive tooth located on the most other side around the first axial line, and
the first step part comprises an outer peripheral face which intersects an end part on an outer side in a radial direction of the tooth face of the final drive tooth.

7. The rotation transmission mechanism according to claim 5, wherein each of the plurality of the driven teeth is formed so that a face on the other side around the second axial line is a tooth face, the driven wheel comprises a second step part which is formed at a position adjacent in a circumferential direction to the tooth face of a first driven tooth located on the most one side around the second axial line, and the second step part comprises an outer peripheral face which intersects an end part on an outer side in a radial direction of the tooth face of the first driven tooth.

8. The rotation transmission mechanism according to claim 7, wherein the driven wheel comprises an extended part which is formed by extending the driven teeth forming part to the most one side in the second axial line direction with respect to the first driven tooth, and the second step part is formed in the extended part.

9. The rotation transmission mechanism according to claim 1, wherein the drive teeth forming part comprises the drive teeth one by one at the positions in the first axial line direction, and the driven teeth forming part comprises the driven teeth one by one at the positions in the second axial line direction.

10. The rotation transmission mechanism according to claim 1, wherein in each of regions where the plurality of the driven teeth are sequentially slid on the plurality of the cam faces, a subsequent driven tooth for a next region begins to contact with a subsequent corresponding cam face while the driven tooth in a current region is contacted with the corresponding cam face.

11. The rotation transmission mechanism according to claim 1, wherein in the plurality of the drive teeth, the drive tooth located on the most one side in the first axial line direction is located on the most other side around the first axial line, in the plurality of the driven teeth, the driven tooth located on the most one side in the second axial line direction is located on the most other side around the second axial line, and in the plurality of the cam faces, the cam face located on the most one side in the first axial line direction is located on the most one side around the first axial line.

12. The rotation transmission mechanism according to claim 11, wherein each of the plurality of the drive teeth is formed so that a face on the one side around the first axial line is a tooth face, and the drive wheel comprises a drive tooth pitch measuring step part which intersects an end part on an outer side in a radial direction of the tooth face of a final drive tooth located on the most other side around the first axial line.

13. The rotation transmission mechanism according to claim 11, wherein each of the plurality of the driven teeth is formed so that a face on the other side around the second axial line is a tooth face, the driven wheel comprises a driven tooth pitch measuring step part which intersects an end part on an outer side in a radial direction of the tooth face of a first driven tooth located on the most one side around the second axial line.

14. The rotation transmission mechanism according to claim 1, wherein the driven teeth forming part comprises a final driven tooth with which the drive teeth are not abutted on the one side around the second axial line with respect to the plurality of the driven teeth and on the other side in the second axial line direction with respect to the plurality of the driven teeth, and the cam face forming part comprises a final cam face with which the final driven tooth is abutted.

15. The rotation transmission mechanism according to claim 14, wherein respective pitches of the plurality of the driven teeth are equal to each other, and a pitch between the driven tooth located on the most one side around the second axial line and the final driven tooth is wider than the pitches of the plurality of the driven teeth.

16. The rotation transmission mechanism according to claim 15, wherein outer diameters of each of the cam faces and the final cam face are reduced from the one side around the first axial line to the other side, a reducing rate in the circumferential direction of the outer diameter of a portion of the final cam face located on the one side around the first axial line is smaller than reducing rates of the plurality of the cam faces, and a reducing rate in the circumferential direction of the outer diameter of a portion of the final cam face located on the other side around the first axial line is larger than reducing rates of the plurality of the cam faces.

17. The rotation transmission mechanism according to claim 1, wherein in each of the plurality of the cam faces, an end part on the one side around the first axial line is located on an outer side in a radial direction with respect to the cam face adjacent on the one side around the first axial line.

18. The rotation transmission mechanism according to claim 17, wherein an outer diameter of each of the plurality of the cam faces is reduced from the one side around the first axial line to the other side.

19. The rotation transmission mechanism according to claim 17, wherein the drive teeth forming part comprises the drive teeth one by one at the positions in the first axial line direction, and the driven teeth forming part comprises the driven teeth one by one at the positions in the second axial line direction.

20. The rotation transmission mechanism according to claim 17, wherein in each of regions where the plurality of the driven teeth are sequentially slid on the plurality of the cam faces, a subsequent driven tooth for a next region begins to contact with a subsequent corresponding cam face while the driven tooth in a current region is contacted with the corresponding cam face.

21. The rotation transmission mechanism according to claim 1, wherein the plurality of the cam faces comprises a cam face whose end part on the one side around the first axial line is overlapped with an outer side edge of the cam face which is adjacent to the one side around the first axial line.

22. The rotation transmission mechanism according to claim 1, wherein each of the plurality of the cam faces comprises a cam region which is not overlapped in the circumferential direction with the cam face adjacent on the other side around the first axial line, and the cam region of the first cam face located on the most one side around the first axial line is wider in the circumferential direction than the cam regions of the other cam faces except a final cam face located on the most other side around the first axial line.

23. The rotation transmission mechanism according to claim 22, wherein a turning speed of the driven wheel during one of the plurality of the driven teeth is slid on the first cam face is smaller than a turning speed of the driven wheel during another one of the plurality of the driven teeth is slid on its corresponding cam face which is different from the first cam face and the final cam face.

24. The rotation transmission mechanism according to claim 22, wherein
the plurality of the cam faces comprises a second cam face located at a second position from the most one side around the first axial line, and
an end part on the one side around the first axial line of the second cam face is located on an inner side in a radial direction with respect to an end part on the one side around the first axial line of the cam face located on the other side around the first axial line with respect to the second cam face.

25. The rotation transmission mechanism according to claim 1, further comprising a position sensor structured to monitor an angular position of the drive wheel or the driven wheel.

26. The rotation transmission mechanism according to claim 25, wherein the position sensor comprises a turnable lever which is displaced by a sensor cam face provided in the drive wheel and a switch which is turned on and off by displacement of the turnable lever.

27. The rotation transmission mechanism according to claim 26, wherein the position sensor is structured so that, after the driven wheel is turned to the most one side around the second axial line, an output of the switch is switched at a midway position in a stopped region of the driven wheel and, after the driven wheel is turned to the most other side around the second axial line, the output of the switch is switched at a midway position in a stopped region of the driven wheel.

28. The rotation transmission mechanism according to claim 1, wherein the drive wheel comprises a first assembling mark structured to position a turning position of the drive wheel around the first axial line to an assembling reference position.

29. The rotation transmission mechanism according to claim 1, wherein the driven wheel comprises a second assembling mark structured to position a turning position of the driven wheel around the second axial line to an assembling reference position.

30. A damper device comprising:
the rotation transmission mechanism defined in claim 1;
a frame which is formed with an opening part;
a motor structured to drive the drive wheel; and
a baffle to which turning of the driven wheel around the second axial line is transmitted and thereby the opening part is opened and closed by the baffle.

31. The damper device according to claim 30, wherein the urging member urges the baffle in an open direction or a closing direction with respect to the opening part and thereby the urging member urges the driven wheel to the other side around the second axial line.

32. The damper device according to claim 30, wherein the motor is capable of outputting a rotation driving force for driving the drive wheel only to the one side around the first axial line.

33. The damper device according to claim 30, wherein the cam face forming part comprises a plurality of cam faces at positions different from each other in the first axial line direction on which the plurality of the driven teeth are sequentially slid when the driven wheel is turned to the other side around the second axial line by the urging force of the urging member.

34. The damper device according to claim 33, wherein an outer diameter of each of the plurality of the cam faces is reduced from the one side around the first axial line to the other side.

35. The damper device according to claim 33, wherein
the drive teeth forming part comprises the drive teeth one by one at the positions in the first axial line direction, and
the driven teeth forming part comprises the driven teeth one by one at the positions in the second axial line direction.

36. The damper device according to claim 33, wherein in each of regions where the plurality of the driven teeth are sequentially slid on the plurality of the cam faces, a subsequent driven tooth for a next region begins to contact with a subsequent corresponding cam face while the driven tooth in a current region is contacted with the corresponding cam face.

37. The damper device according to claim 33, wherein
in the plurality of the drive teeth, the drive tooth located on the most one side in the first axial line direction is located on the most other side around the first axial line,
in the plurality of the driven teeth, the driven tooth located on the most one side in the second axial line direction is located on the most other side around the second axial line, and
in the plurality of the cam faces, the cam face located on the most one side in the first axial line direction is located on the most one side around the first axial line.

38. The damper device according to claim 33, wherein
the driven teeth forming part comprises a final driven tooth with which the drive teeth are not abutted on the one side around the second axial line with respect to the plurality of the driven teeth and on the other side in the second axial line direction with respect to the plurality of the driven teeth, and
the cam face forming part comprises a final cam face with which the final driven tooth is abutted.

39. The damper device according to claim 30, wherein the rotation transmission mechanism further comprises a position sensor structured to monitor an angular position of the drive wheel or the driven wheel.

* * * * *